Y2587 OR 3,973,237

T235/379

United States Patent [19]

Sawaguchi et al.

[11] 3,973,237

[45] Aug. 3, 1976

[54] ARTICLE DEPOSITING MACHINE

[75] Inventors: Yoji Sawaguchi, Tokyo; Koichi Suzuki, Kawasaki; Katsumasa Ogawa, Yokohama, all of Japan

[73] Assignee: Fujitsu Ltd., Kawasaki, Japan

[22] Filed: June 14, 1974

[21] Appl. No.: 479,518

[30] Foreign Application Priority Data

June 28, 1973 Japan .............................. 48-73031

[52] U.S. Cl. .......................... 235/61.7 B; 194/4 R; 235/61.9 A

[51] Int. Cl.² ...................... G06K 7/08; G06K 1/14; G07F 1/06

[58] Field of Search .................. 235/61.7 B, 61.7 R, 235/61.9 R, 61.11 E, 61.9 A, 61.11 D, 61.12 N, 61.12 M, 61.1; 340/149 A; 194/4 R

[56] References Cited

UNITED STATES PATENTS

| | | | |
|---|---|---|---|
| 3,104,314 | 9/1963 | Simjian | 235/61.9 R |
| 3,648,020 | 3/1972 | Tateisi | 235/61.7 B |
| 3,697,729 | 10/1972 | Edwards | 235/61.7 B |
| 3,778,596 | 12/1973 | Wapner | 235/61.9 R |
| 3,845,277 | 10/1974 | Voss | 235/61.7 B |

*Primary Examiner*—Daryl W. Cook
*Assistant Examiner*—Robert M. Kilgore
*Attorney, Agent, or Firm*—Staas & Halsey

[57] ABSTRACT

An article depositing machine is disclosed which is capable of almost automatically achieving operations for depositing money in a bank or like establishments even in the absence of a bank attendant and which is provided with means for entering a customer's identification number and other necessary information, means for offering to a customer an article container for sealing therein a bill, a written request for payment or like article, means for entering information on the article container offered to the customer, means for storing therein the information on the article container together with the customer's identification number and the like, and means for storing therein the article container deposited by the customer.

19 Claims, 27 Drawing Figures

FIG. 20A

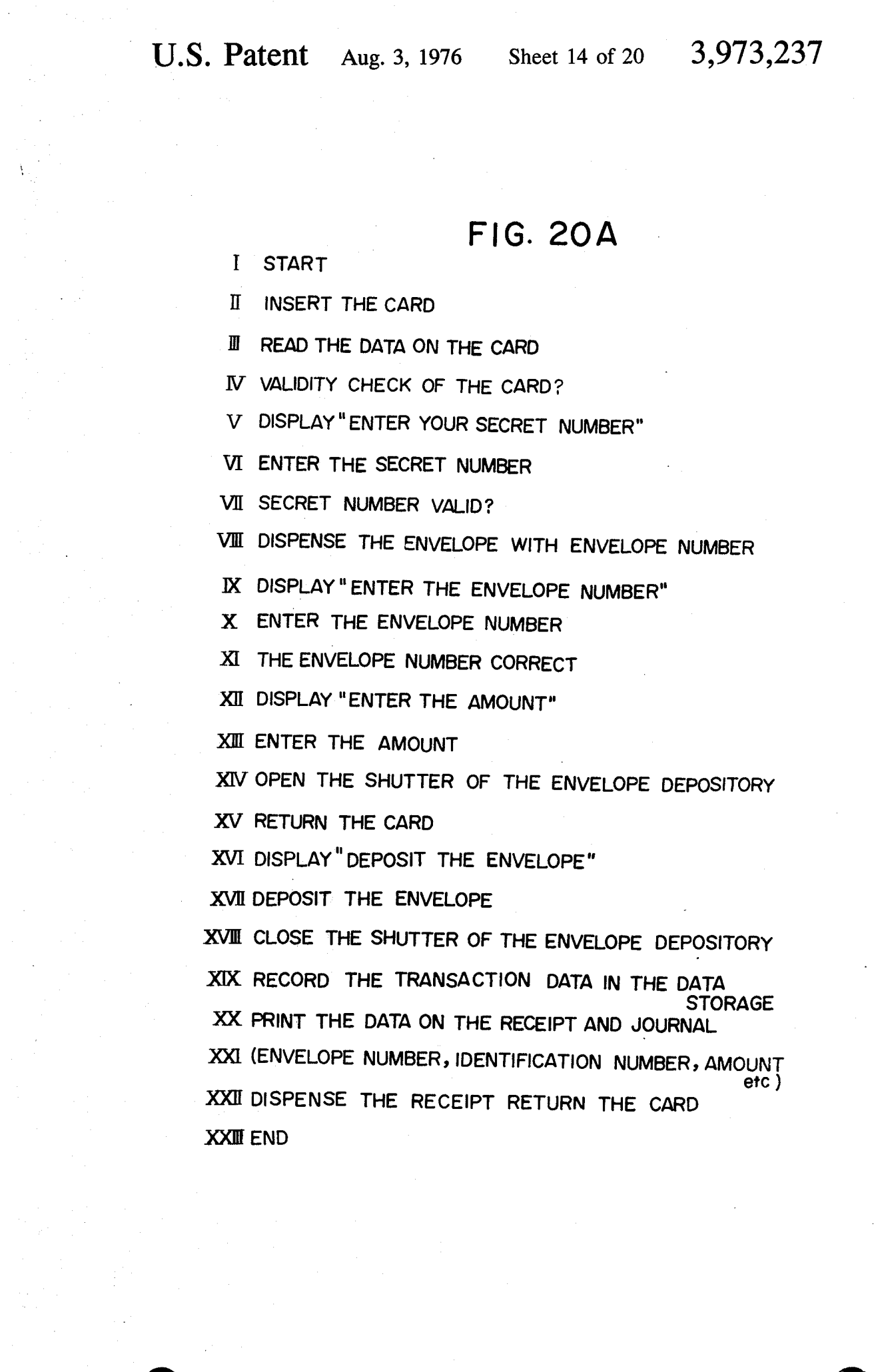

I START

II INSERT THE CARD

III READ THE DATA ON THE CARD

IV VALIDITY CHECK OF THE CARD?

V DISPLAY "ENTER YOUR SECRET NUMBER"

VI ENTER THE SECRET NUMBER

VII SECRET NUMBER VALID?

VIII DISPENSE THE ENVELOPE WITH ENVELOPE NUMBER

IX DISPLAY "ENTER THE ENVELOPE NUMBER"

X ENTER THE ENVELOPE NUMBER

XI THE ENVELOPE NUMBER CORRECT

XII DISPLAY "ENTER THE AMOUNT"

XIII ENTER THE AMOUNT

XIV OPEN THE SHUTTER OF THE ENVELOPE DEPOSITORY

XV RETURN THE CARD

XVI DISPLAY "DEPOSIT THE ENVELOPE"

XVII DEPOSIT THE ENVELOPE

XVIII CLOSE THE SHUTTER OF THE ENVELOPE DEPOSITORY

XIX RECORD THE TRANSACTION DATA IN THE DATA STORAGE

XX PRINT THE DATA ON THE RECEIPT AND JOURNAL

XXI (ENVELOPE NUMBER, IDENTIFICATION NUMBER, AMOUNT etc)

XXII DISPENSE THE RECEIPT RETURN THE CARD

XXIII END

FIG. 21A

I START

II INSERT THE CARD

III READ THE DATA ON THE CARD

IV VALIDITY CHECK OF THE CARD?

V DISPLAY "ENTER YOUR SECRET NUMBER"

VI ENTER THE SECRET NUMBER

VII SECRET NUMBER VALID?

VIII DISPENSE THE ENVELOPE

IX DISPLAY "ENTER THE AMOUNT"

X ENTER THE AMOUNT

XI OPEN THE SHUTTER OF THE ENVELOPE DEPOSITORY

XII RETURN THE CARD

XIII DISPLAY "DEPOSIT THE ENVELOPE"

XIV DEPOSIT THE ENVELOPE

XV CLOSE THE SHUTTER OF THE ENVELOPE DEPOSITORY

XVI TRANSACTION NUMBER ⟵ TRANSACTION NUMBER + I

XVII PRINT THE TRANSACTION NUMBER ON THE DEPOSITED ENVELOPE

XVIII RECORD THE TRANSACTION DATA IN THE DATA STORAGE

XIX PRINT THE DATA ON THE RECEIPT AND JOURNAL

XX (IDENTIFICATION NUMBER, AMOUNT, TRANSACTION NUMBER etc)

XXI DISPENSE RECEIPT, RETURN THE CARD

XXII END

FIG. 22A

I START

II LOAD THE ENVELOPE WITH SERIAL NUMBER

III SET THE ENVELOPE NUMBER ON THE COUNTER

IV STAND BY

V INSERT THE CARD

VI READ THE DATA ON THE CARD

VII VARIDITY CHECK OF THE CARD

VIII DISPLAY "ENTER YOUR SECRET NUMBER"

IX ENTER THE SECRET NUMBER

X THE SECRET NUMBER VALID?

XI DISPENSE THE ENVELOPE

XII COUNTER IS INCREMENTED BY "1"

XIII DISPLAY "ENTER THE AMOUNT"

XIV ENTER THE AMOUNT

XV OPEN THE SHUTTER OF THE ENVELOPE DEPOSITORY

XVI RETURN THE CARD

XVII DISPLAY "DEPOSIT THE ENVELOPE"

XVIII DEPOSIT THE ENVELOPE

XIX CLOSE THE SHUTTER OF THE ENVELOPE DEPOSITORY

XX RECORD THE TRANSACTION DATA IN THE DATA STORAGE

XXI PRINT THE DATA ON THE RECEIPT AND JOURNAL

XXII (THE CONTENT OF THE COUNTER=ENVELOPE NUMBER, IDENTIFICATION NUMBER, AMOUNT etc)

XXIII DISPENSE THE RECEIPT, RETURN THE CARD

XXIV END

FIG. 23A

I START

II INSERT THE CARD

III READ THE DATA ON THE CARD

IV VARIDITY CHECK OF THE CARD?

V DISPLAY "ENTER YOUR SECRET NUMBER"

VI ENTER THE SECRET NUMBER

VII SECRET NUMBER VARID?

VIII DISPLAY "ENTER THE AMOUNT"

IX ENTER THE AMOUNT

X PRINT THE TRANSACTION DATA OF THE CARD ON THE ENVELOPE

XI DISPENSE THE PRINTED ENVELOPE

XII OPEN THE SHUTTER OF THE ENVELOPE DEPOSITORY

XIII RETURN THE CARD

XIV DISPLAY "DEPOSIT THE ENVELOPE"

XV DEPOSIT THE ENVELOPE

XVI CLOSE THE SHUTTER OF THE ENVELOPE DEPOSITORY

XVII RECORD THE TRANSACTION DATA IN THE DATA STORAGE

XVIII PRINT THE DATA ON THE RECEIPT AND JOURNAL

XIX (IDENTIFICATION NUMBER, AMOUNT etc)

XX DISPENSE RECEIPT, RETURN THE CARD

XXI END

ARTICLE DEPOSITING MACHINE

BACKGROUND OF THE INVENTION

1. Field of the Invention

This invention relates to an article depositing machine which is suitable for an unmanned operation of accepting a deposit or receiving payment into banks or like establishments or for receiving an article in an article depositary.

2. Description of the Prior Art

Heretofore, automatic cash dispensing machines making use of a credit card such, for example, as a magnetic card, have been employed, for example, in banks or like establishments, for the purposes of labor saving of business, giving better service to customers or the like.

With such an automatic cash dispensing machine, it is possible to perform an unmanned cash dispensing operation only by inserting a magnetic card having recorded thereon a customer's identification number and the like into the machine and by actuating keys of the machine.

However, for depositing or paying moneny into a bank, it is necessary, except in isolated cases, for a customer to go to the window of the bank as usual.

With such a system, it is impossible, of course, to deposit or pay money into the bank outside its business hours.

For automation of the system for acceptance of deposit or payment outside the business hours of banks, various developments have been attempted and, as a result, an automatic depositing machine such, for example, as disclosed in the U.S. Pat. No. 3,648,020, has already been proposed. The greatest difficulty in this kind of machine is an examination of the genuineness of cash. In the machine already proposed, bills are inserted into the machine one by one for the examination of the genuineness of cash and for other necessary operations but this is time-consuming and requires a customer to conduct troublesome operations and, in addition, cannot always assure an accurate examination of the genuineness of cash.

With another type of depositing machine, a depositor writes predetermined matters, for example, the amount of money to be deposited, his name, etc., on a depositing container (such, for example, as an envelope) placed outside of the machine, puts money in the container, opens a shutter of a deposit inlet after identified, deposits from the inlet the depositing container having contained therein the cash and then puts up the shutter.

In such a machine, since the depositor is required to write the matters necessary for the deposit on an envelope or the like, there is the possibility of his making a mistake in writing of the necessary matters. Further, no limitation is imposed on the time for opening of the shutter, so that the depositing machine is greatly affected by dust, humidity or by a foreign substance thrown into the machine by a customer on purpose or due to carelessness and this especially true, for example, when water enters the machine.

If characters written on the envelope are erased or blurred or there is a mistake in the matters written on the envelope, trouble arises between the bank and the depositor.

SUMMARY OF THE INVENTION

This invention has for its object to provide an article depositing machine which enables an unmanned but easy and speedy operation for acceptance of deposit of an article such, for example, as deposit or payment in cash, only by inserting into the machine a credit card such as a magnetic card used with an automatic cash dispensing machine or only by actuation of a keyboard of the machine.

One object of this invention is to provide an article depositing machine which is composed of means for entering an identification number of a customer, means for offering to the customer an article container having a particular mark of its own for sealing therein articles such as bills, a written request for payment, etc., means for entering the mark of the article container offered to the customer, means for storing the entered mark of the article container or a mark corresponding thereto together with the identification number of the customer, and means for storing the article container deposited by the customer.

With such a machine, a required article can be deposited easily in a short time by insertion of a magnetic card into the machine or actuation of the keyboard of the machine or the combined use of the both methods. This machine is of particular utility when employed for depositing or paying cash into a bank. By the envelope having previously marked thereon its envelope number, a journal or the like having printed thereon the envelope number, etc. which the customer enters, the owner of the envelope deposited in the machine is identified, so that various complicated matters need not be printed on the envelope, and consequently an expensive exclusive envelope printing mechanism is not necessary. Further, since no mechanism for examining the genuineness of cash is required, the construction of the machine is extremely simplified and, for example, when this machine is combined with an automatic cash dispensing machine installed in a bank, it is possible to provide a deposit or payment system only by adding envelope dispensing and receiving mechanisms.

Another object of this invention is to provide an article depositing machine which is composed of means for entering an identification number of a customer, means for offering to the customer an article container for sealing therein bills, a written request for payment, etc., means for storing therein at least a transaction number and the identification number of the customer for each transaction, means for printing a number corresponding to the above transaction number on the article container deposited by the customer, and means for storing the numbered article container.

With the above machine, a desired article can be deposited easily and rapidly by insertion of a magnetic card into the machine or actuation of the keyboard of the machine or the combined use of the both methods. This machine is particularly suitable for deposit or payment of cash into a bank and since the customer is required only to actuate the keyboard of the machine and put the envelope in the machine after sealing the article in the envelope, the operation for deposit or payment is very simple and easy.

Further, no mechanism for examining the genuineness of cash is involved, so that the construction of the machine is appreciably simple and, when this machine is combined with a conventional automatic cash dispensing machine, it is possible to provide a deposit or payment system only by adding envelope dispensing and receiving mechanisms and a numbering printer.

Another object of this invention is to provide an article depositing machine which is composed of means for entering an identification number of a customer, means for offering to the customer an article container having a serial number for sealing therein articles such as bills, a written request for payment, etc., means for counting each offering of the article container to the customer, means for storing therein at least the identification number of the customer and the number assigned to the article container for every transaction, means for receiving the article container deposited by the customer in the machine after sealing the articles in the article container, and means for storing therein the deposited article container.

With such a machine, a desired article can be deposited easily and rapidly by insertion of a magnetic card into the machine or actuation of the keyboard of the machine or the combined use of the both of them. This machine is of particular utility when employed for deposit or payment of cash into a bank. Since it is sufficient for the customer only to actuate the keyboard and put the envelope in the machine after sealing the articles in the envelope, the operation for deposit or payment is very simple and easy.

Further, this machine does not involve the use of a mechanism for examining the genuineness of cash, and hence is relatively simple in construction. For example, when this machine is employed in combination with a conventional automatic cash dispensing machine, it is possible to provide an article depositing system for deposit or payment into a bank only by adding envelope dispensing and receiving mechanisms, an envelope number counter counting the envelope number and reading its content and an adjust key for bringing the content of the envelope number counter into agreement with the envelope number at the time of loading the envelope.

Still another object of this invention is to provide an article depositing system which is composed of means for entering a deposit information signal by either one or both of reading a card of a customer and actuation of a keyboard by the customer, means for printing predetermined matters on a deposit container stored in the machine based on the deposit information signal and automatically offering a predetermined number of containers to the customer, means for opening a shutter of a deposit inlet a predetermined period of time after offering of the deposit container to the customer so as to receive the deposit container having sealed therein cash of the customer, and means for detecting the deposit container put in the machine to close the shutter of the deposit inlet.

With such a machine, matters necessary for deposit are all printed on the deposit container at the time of offering the container to the customer, so that there is no possibility of the customer making a mistake in writing the required matters for deposit. Further, since the time for opening the shutter is limited i.e., quite short, it is possible to avoid troubles of the machine which result from dust, humidity or an alien substance which is introduced into the machine by the user on purpose or due to carelessness, thus providing for enhanced reliability in the automatic depositing operation.

BRIEF DESCRIPTION OF THE DRAWINGS

This invention will be more fully understood by the following description and the attached drawings, in which:

FIGS. 20 and 20A are flow charts of the example of FIG. 4;

FIG. 21 and 21A are flow charts of the example of FIG. 8;

FIGS. 22 and 22A are flow charts of the example of FIG. 10; and

FIGS. 23 and 23A are flow charts of the example of FIG. 16.

DESCRIPTION OF THE PREFERRED EMBODIMENTS

In the apparatus of this invention, a customer's identification number may be entered by actuation of a keyboard or reading a magnetic card having recorded thereon the identification number or by the combined use of the both methods.

In the case of employing both methods in combination, transactions are performed only when a number entered from the keyboard and the identification number recorded on the magnetic card correspond to each other. This is similar to those disclosed in detail in U.S. Pat. Nos. 3,221,304 and 3,662,345, and hence will not be described in detail.

Figure 1:
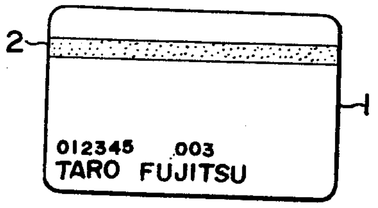
FIG. 1 is a front view showing one example of a magnetic card for use in this invention.

FIG. 1 is a front view of one example of a magnetic card for use in the apparatus of this invention.

In FIG. 1, reference numeral 1 indicates a magnetic card and 2 designates a magnetic recording medium mounted on one surface of the magnetic card 1. The sizes and shapes of the magnetic card 1 and the magnetic recording medium 2 are internationally standardized. The magnetic recording card 2 has recorded thereon an identification number for identifying a customer, a code for identifying the validity of the magnetic card 1, a code for comfirming the validity of its user, etc.

An article container for use in the apparatus of this invention is desired to be a bag-like one which can be sealed, for example, an envelope, but may be some other types.

Figure 2:
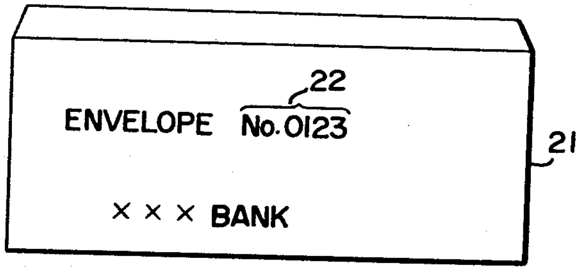
FIG. 2 is a front view showing one example of an envelope for use in this invention.

FIG. 2 is a front view of one example of an envelope for use in one example of this invention apparatus.

In FIG. 2, reference numeral 21 denotes the envelope and 22 represents a particular number printed on the envelope 21.

For storing the mark of the article container of the apparatus of this invention or a mark corresponding thereto together with the customer's identification number, it is possible to employ a memory such as a magnetic disc, a magnetic core, a paper tape or the like or a journal issuing device such as a printer or the like but it is desired to use the both of them in combination with each other. Namely, if information entered in the depositing machine is stored in the memory which is provided in association with the journal issuing device, the entered information can be processed as it is when automatically processed by an information processing unit (such, for example, as a computer), so that the combined use of the memory and the journal issuing device is more advantageous. Further, if the journal issuing device is provided as the aforesaid storing means in addition to the memory, a person in charge can check the deposit on the spot, which is convenient. Of course, it is also possible to employ either one of the memory and the journal issuing device as the aforementioned storing means.

Figure 3:
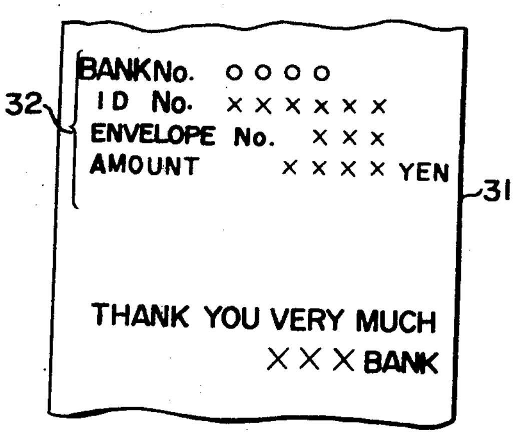
FIG. 3 is a front view showing the principal part of one example of a receipt or journal issued from the machine of this invention.

FIG. 3 is a front view of the principal part of one example of a receipt issued from one example of the apparatus of this invention or a journal which is a duplicate of a chit of a bank.

In FIG. 3, reference numeral 31 indicates a receipt or journal and 32 designates records such as, for example, the customer's identification number, the aforementioned envelope number, the amount of money, an indication of deposit or payment, etc.

Figure 4:
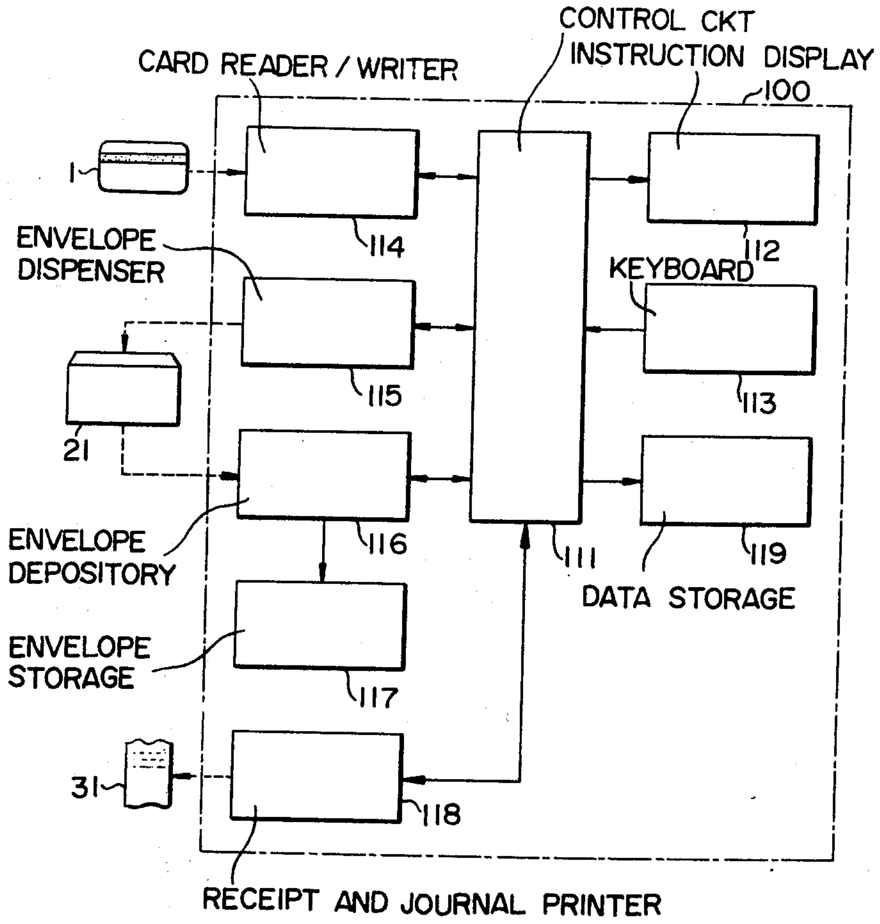
FIG. 4 is a block diagram illustrating the principal part of one example of the machine of this invention.

FIG. 4 illustrates in block form the principal part of one example of the apparatus of this invention, which employs, as customer's identification number entering means, a keyboard and a card reader/writer in combination with each other, an envelope as the article container and a combination of a data storage and a receipt and journal printer as the storing means.

In FIG. 4, reference numeral 100 indicates generally the apparatus; 111 designates a control circuit; 112 denotes an instruction display; 113 identifies the keyboard; 114 represents the card reader/writer; 115 shows an envelope dispenser; 116 refers to an envelope depository; 117 indicates an envelope storage; 118 designates the receipt and journal printer; and 119 denotes the data storage. The parts described previously with regard to FIGS. 1 to 3 are identified by like reference numerals and no description will be repeated.

Now, the operation of each part of the apparatus of FIG. 4 will be described but since an understanding of the general operation of the control circuit 111 will facilitate a better understanding of the overall operation of the apparatus, a description will be given first of the control circuit 111.

Figure 18:
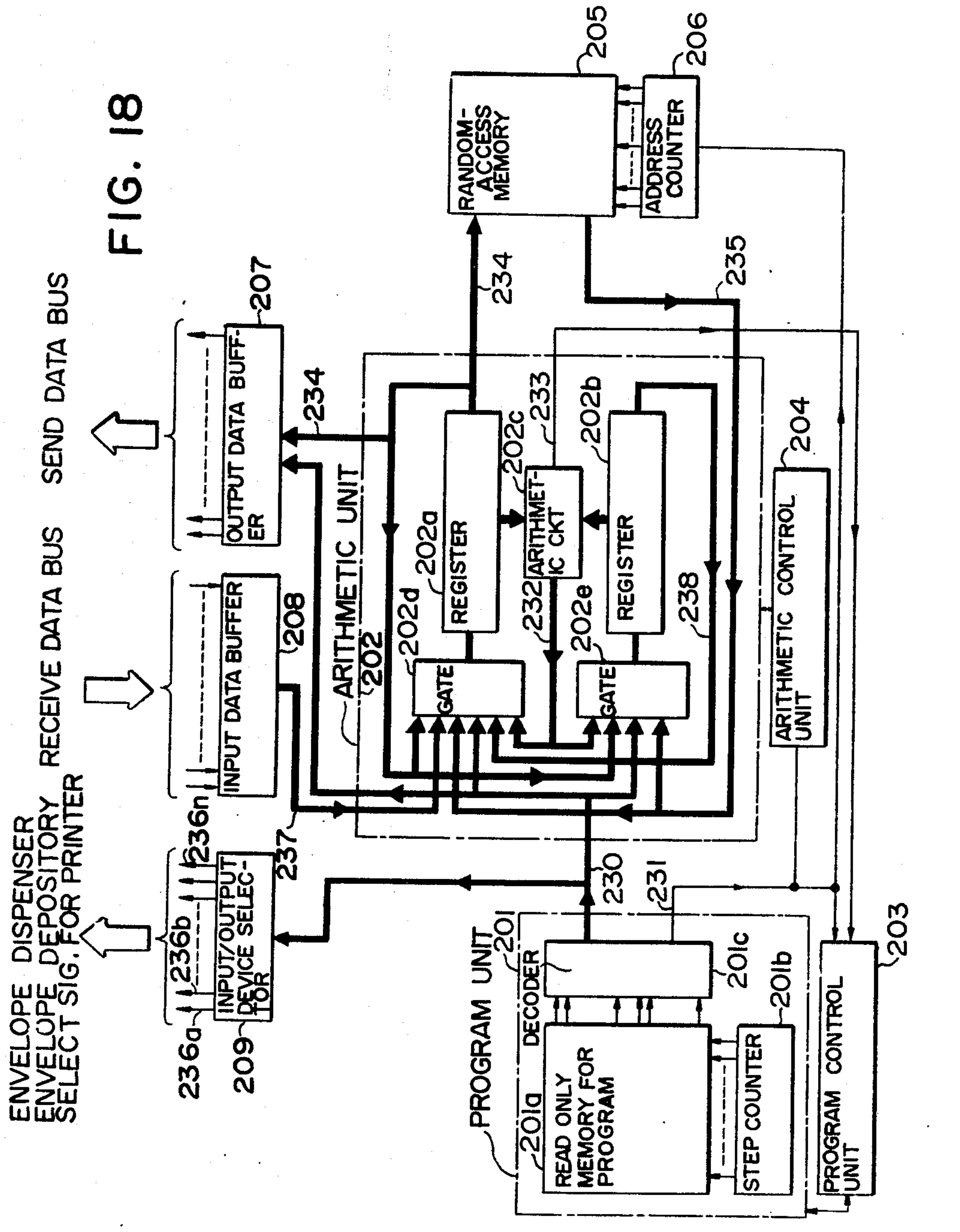
FIG. 18 is a block diagram of a control circuit for use in the machine of this invention.

In FIG. 18, there is illustrated in block form one example of the control circuit 111 for use in this invention, which is similar in construction to an ordinary computer (in particular, a micro computer).

In FIG. 18, reference numeral 201 indicates a program unit; 202 designates an arithmetic unit; 203 represents a program control unit; 204 identifies an arithmetic control unit; 205 denotes a random-access memory; 206 shows an address counter; 207 refers to an output data buffer; 208 designates an input data buffer; and 209 denotes an input/output device selector. The program unit 201 comprises a read only memory for program 201*a*, a step counter 201*b* and a decoder 201*c*. The arithmetic unit 202 comprises registers 202*a* and 202*b*, an arithmetic circuit 202*c* and gates 202*d* and 202*e*.

Next, the general operation of this circuit will be described.

A program which decides the operation sequence of each unit is stored in the read only memory for program 201*a*. The read only memory for program 201*a* is formed with an IC memory, a core memory or the like and each address of the read only memory for program is designated by the step counter 201*b*. The step counter 201*b* is controlled by the program control unit 203. The content of the address designated by the step counter 201*b* is read out from the read only memory for program 201*a* to the decoder 201*c*. The decoder 201*c* decodes the read-out content and sends it out to a line 230 or 231 depending on whether it is a data or command.

Where the decoded content is data and particularly input/output selection data, it is applied to the input/output device selector 209, which, in turn, applies a selection signal to any one of lines 236*a* to 236*n* connected to input/output units so as to select one of them.

Other data is applied to the registers 202*a* and 202*b* through the gates 202*d* and 202*e*. Further, the data to each input/output unit is applied to the output data buffer 207, which is connected to each input/output unit through a send data bus.

Moreover, if the decoded content is a command, it is applied to the arithmetic control unit 204 or the program control unit 203.

Based on the command, the arithmetic control unit 204 actuates the gates 202*d* and 202*e*, controls the read timing of the registers 202*a* and 202*b* or designates the kind of arithmetic operation to be performed by the arithmetic circuit 202*c*. The program control unit 203 controls the step counter 201*b* or effects a timing control of the read only memory for program 201*a* and the decoder 201*c* based on the command.

A line 231 is connected to the address counter 206 and achieves addressing of the random-access memory 205 based on a command supplied from the decoder 201*c*.

The arithmetic unit 202 comprises the two registers 202*a* and 202*b*, the input control gates 202*d* and 202*e* for controlling the inputs to the registers 202*a* and 202*b*, respectively, and the arithmetic circuit 202*c* for effecting arithmetic operations (calculations such as addition, subtraction, multiplication and division and logical operations such as comparison and the like) of the contents of the registers 202*a* and 202*b*. The arithmetic unit 202 is controlled by the arithmetic control unit 204 which is placed under the control of the program stored in the read only memory for program 201*a*.

A signal coming from each input/output unit such as the card reader/writer or the like through the send data bus is applied to the register 202*a* through the input data buffer 208, a line 237 and the gate 202*d*. In the case of an arithmetic operation of the content of the register 202*a*, an operand is placed in the register 202*b* and an arithmetic operation of the contents of the both registers 202*a* and 202*b* is effected by the arithmetic circuit 202*c* and the result of the operation is placed in the registers 202*a* and 202*b* through a line 232 and the gates 202*d* and 202*e*. The command obtained with the logical operation of the logical (i.e., arithmetic circuit 202*c* is applied to the program control unit 203 through a line 233.

In the case of merely placing the data from the input-/output unit, it is placed in the random-access memory 205 through the register 202*a* and a line 234.

Conversely, in the case of sending out to the input-/output unit data placed in some address of the random-access memory 205, the content of the read only memory for program 201*a* is decoded by the decoder 201*c* and fed to the address counter 206 through the line 231 and the address counter 206 designates a predetermined address of the random-access memory 205 and its content is transferred first to the register 202*a* through a line 235 and the gate 202*d*. Then, an instruction stored in the read only memory for program 201*a* is applied to the input/output device selector 209 to cause it to select an input/output unit to which the data is to be sent out and, at the same time, to transfer the content of the register 202*a* to the output data buffer 207 through a line 234.

Next, a description will be made with regard to the relationship between the input/output device selector 209 and input/output units in the control circuit 111.

Figure 19:
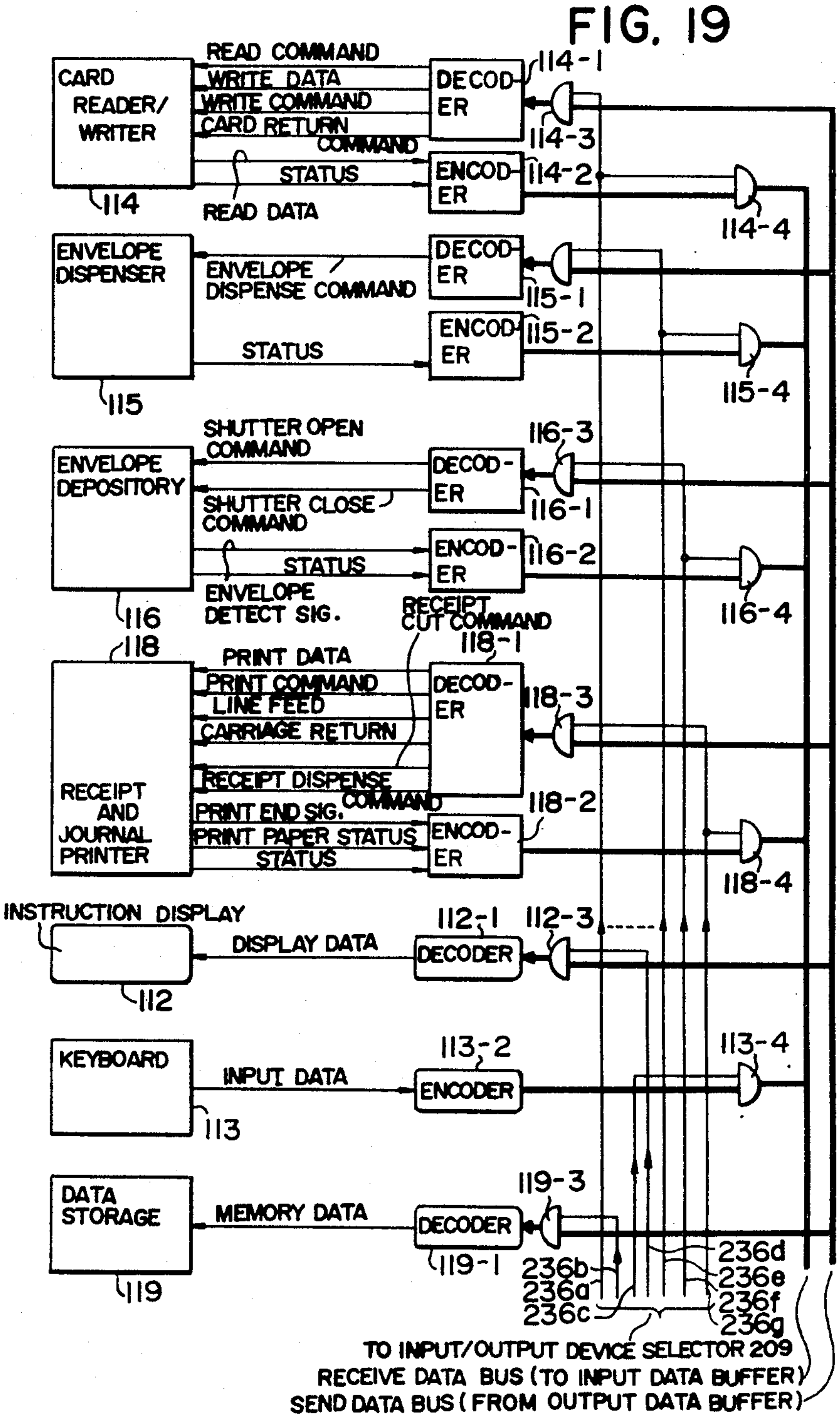
FIG. 19 is a diagram, for explaining the connection of the control circuit and input/output units.

FIG. 19 is a block diagram showing the connections of the input/output device selector 209 and the send and receive data buses to the input/output units. In FIG. 19, the same parts as those shown in FIGS. 4 and 18 are indicated by like reference numerals. Reference numeral 114-1 indicates a decoder of the card reader/-writer 114; 114-2 designates an encoder of the card reader/writer 114; 114-3 and 114-4 identify AND circuits; 115-1 represents a decoder of the envelope dispenser 115; 115-3 and 115-4 denote AND circuits; 116-1 shows a decoder of the envelope depository 116; 116-2 refers to an encoder of the envelope depository 116; 116-3 and 116-4 indicate AND circuits; 118-1 designates a decoder of the receipt and journal printer 118; 118-2 identifies an encoder of the receipt and journal printer 118; 118-3 and 118-4 denote AND circuits; 112-1 represents a decoder of the instruction display 112; 112-3 shows an AND circuit; 113-1 refers to an encoder of the keyboard 113; 113-4 indicates an AND circuit; 119-1 designates a decoder of the data storage 119; 119-3 identifies an AND circuit; 236*a* denotes a selection line of the card reader/writer 114; 236*b* represents a selection line of the data storage 119;

236*c* shows a selection line of the keyboard 113; 236*d* refers to a selection line of the instruction display 112; 236*e* indicates a selection line of the envelope dispenser 115; 236*f* represents a selection line of the envelope depository 116; and 236*g* denotes a selection line of the receipt and journal printer 118.

The respective input/output units 112, 113, 114, 115, 116, 118 and 119 can be connected with the output data buffer 207 of the control circuit 111 through the send data bus and connected with the input data buffer 208 through receive data bus.

The connection of the input/output units 112, 113, 114, 115, 116, 118 and 119 with the send data bus or the receive data bus is achieved by controlling the AND circuits 112-3 to 119-3 and 113-4 to 118-4 by the selection lines 236*a* to 236*g* connected to the input-/output device selector 209.

Further, decoders 112-1 to 119-1 connected to the input/output units 112 to 116, 118 and 119 decode information (or a data) from the send data bus and apply it to the input/output units. On the other hand, the encoders 113-2 to 118-2 encode information (or a data) from the input/output units and apply it to the receive data bus.

Figure 20:
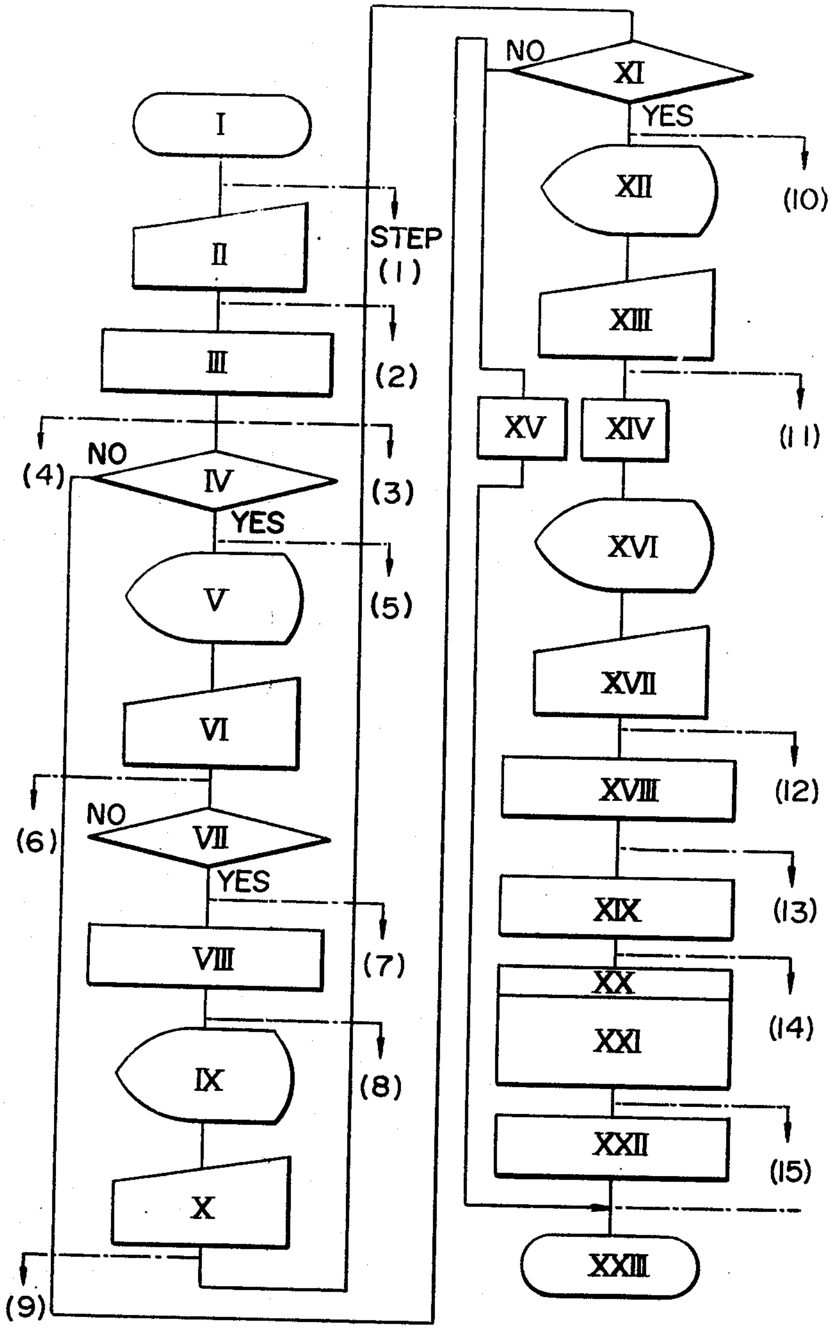

Referring now to the flow charts shown in FIGS. 20 and 20A, a description will be given of the process of automatic deposit or payment which is achieved by the actuation of the apparatus depicted in FIG. 4.

Step 1: At first, a customer inserts the magnetic card 1 into the card reader/writer 114. By the insertion of the magnetic card, an insertion detecting signal is applied to the input data buffer 208 from the card reader/writer 114 through the receive data bus. The content fed to the input data buffer 208 is moved to the register 202*a*. At the same time, the program control unit 203 applies a normal insertion detecting signal from the read only memory for program 201*a* to the register 202*b* and the contents of the both registers 202*a* and 202*b* are compared by the arithmetic circuit 202*c* with each other to confirm that the insertion detecting signal fed from the card reader/writer 114 is a correct signal and then this information is supplied to the program control unit 203 through a line 233.

Step 2: Based upon this information, the program control unit 203 reads out a program of the next operation sequence from the read only memory for program 201*a*. Namely, in order to cause the card reader/writer 114 to read the data on the magnetic card, a card reader/writer 114 selecting command and a read command are applied through the decoder 201*c* from the read only memory for program 201*a* to the input/output device selector 209 and the output data buffer 207, respectively. The card reader/writer 114 applies information of the send data bus connected with the output data buffer to the decoder 114-1 by the opening of the gate 114-3 by the card read/writer selection line which is connected to input/output device selector 209, thus causing the card reader/writer 114 to perform the read operation.

The card reader/writer 114 reads the data on the inserted magnetic card 1 and applies the data to the input data buffer 208 of the control circuit 111 through the send data bus.

Step 3: In the control circuit 111, the content of the input data buffer 208 is moved to the register 202*a* and, in order to check the validity of the magnetic card 1, for example, its term of validity and kind and whether it is a card which may be transacted with, the terms of validity, codes of kinds of cards which may be transacted with, hot card numbers, etc., which are stored in the read only memory for program 201*a*, are sequentially read out into the register 202*b* and compared by the arithmetic circuit 202*c* with the content moved to the register 202*a*.

At the same time, the content of the register 202a is stored at a predetermined address of the random-access memory 205.

Step 4: If the magnetic card 1 is found invalid as a result of the above comparison, the program control unit 203 causes the read only memory for program 201*a* to derive therefrom an invalidity signal and, by the input/output device selector 209, a return signal is applied from the output data buffer 207 to the card reader/writer 114, thus returning the magnetic card 1.

Step 5: If the magnetic card 1 is found valid, a customer is given notice to enter into the apparatus a secret number which only a right possessor of the card knows, for example, his identification number, so as to check whether the magnetic card 1 is being used by its right owner or not. This notification is achieved by the actuation of the instruction display 112 which is effected by supplying the input/output device selector 209 with a signal selecting the instruction display 112 and the output data buffer 207 with a data for selecting the instruction display 112 from the read only memory for program 201*a*.

Given the above notice, the customer enters his identification number into the apparatus by actuating the keyboard 113. At this time, a signal for selecting the keyboard 113 is applied from the read only memory for program 201*a* to the input/output device selector 209, so that a signal from the keyboard 113 is transmitted through the receive data bus to the input data buffer 208 of the control circuit 111.

In the control circuit 111, in order to check whether or not the identification number recorded on the magnetic card 1 and that entered from the keyboard 113 bear a predetermined relation to each other, the content of the input data buffer 208 is once moved to the register 202*a* and the identification number on the magnetic card stored in the random-access memory 205 is moved to the register 202*b* and then the contents of the both registers 202*a* and 202*b* are compared by the arithmetic circuit 202*c* with each other. If they bear the predetermined relation to each other, the customer is regarded as a right owner of the magnetic card 1 and the transaction proceeds.

Step 6: Where the contents of the registers 202*a* and 202*b* do not bear the predetermined relation to each other, steps similar to those in the case of the magnetic card 1 being invalid are taken. These steps are taken by applying the arithmetic result of the arithmetic circuit 233 to the program control unit 203.

Step 7: Where the transaction is allowed to proceed as a result of the arithmetic operation of the arithmetic circuit 233, the program control unit 203 sends a signal for selecting the envelope dispenser 115 to the input-/output device selector 209 from the read only memory for program 201*a* and, at the same time, sends an envelope dispense command to the output data buffer 207. As a result of this, the envelope dispenser 115 dispenses the envelope 21.

Upon dispensing the envelope 21, an envelope dispense status signal is applied to the input data buffer 208 through the receive data bus and the content of the input data buffer 208 is moved to the register 202*a* and also stored at a predetermined address of the random-access memory 205.

Step 8: At the same time, the program control unit 203 sends a command for selecting the instruction display 112 to the input/output device selector 209 from the read only memory for program 201*a* and also sends data for selecting the instruction display 112 to the output data buffer 207. Thus, the instruction display 112 gives the customer on instruction to enter into the apparatus the particular number recorded on the envelope 21. Then, the program control unit 203 applies a command of selecting the keyboard 113 to the input/output device selector 209 from the read only memory for program 201*a*.

When the customer has entered the number of the envelope 21 through the keyboard 113, the number of the envelope 21 is applied to the input data buffer 208 through the receive data bus and then to the register 202*a*. The control circuit 111 checks whether the entered envelope number is correct or not. This can easily be achieved by assigning a special check digit to the envelope number, storing the check digit in the read only memory for program 201*a*, reading it out to the register 202*b* and checking it by the arithmetic circuit 202*c* or by assigning a serial number to the envelope, storing it in the read only memory for program 201*a*, reading it out to the register 202*b* and checking it by the arithmetic circuit 202*c*. Based on the signal thus obtained, the program control unit 203 applies the envelope number entered in the read only memory for program 201*a* to the random-access memory 205 from the register 202*a*.

Step 9: If the envelope number is not correct, the magnetic card 1 is returned to the customer as in the case where the magnetic card 1 is invalid.

Step 10: If the envelope number is correct, the arithmetic circuit 202*c* sends a signal to the program control unit 203 through the line 233 and, based on the signal, the program control unit 203 supplies the read only memory for program 201*a* with a signal instructing it to apply a command of selecting the instruction display 112 to the input/output device selector 209 and data for selecting the instruction display 112 to the output data buffer 207. Thus, the instruction display 112 gives notice to the customer to enter the amount of money to be deposited or paid.

Then, the program control unit 203 sends a command of selecting the keyboard 113 to the input/output device selector 209 from the read only memory for program 201*a*.

When the input data of the amount of money has been entered in the input data buffer 208 of the control circuit 111 by the actuation of the keyboard 113 by the customer, the content of the input data buffer 208 is moved to the random-access memory 205 through the register 202*a*.

Step 11: Further, the program control unit 203 sends from the read only memory for program 201*a* a command of selecting the instruction display 112 to the input/output device selector 209 and a data for selective display of the instruction display 112 to the output data buffer 207. As a result of this, the instruction display 112 gives the customer an instruction to put cash to be deposited, a payment slip, etc. in the envelope 21 and deposit the envelope 21 in the envelope depository 116. At the same time, the program control unit 203 applies from the read only memory for program 201*a* a command of selecting the envelope depository 116 to the input/output device selector 209 and a shutter open command to the output data buffer 207, thus opening the shutter of the envelope depository 116.

The envelope 21 deposited in the envelope depository 116 is temporarily stored in the envelope storage 117.

An envelope detect signal from the envelope depository 116 is fed to the input data buffer 208 through the receive data bus and then to the register 202*a*. At this time, the program control unit 203 sends, as the next operation sequence, a normal envelope detect signal to the register 202*b* from the read only memory for program 201*a* and the contents of the both registers 202*a* and 202*b* are compared by the arithmetic circuit 202*c* with each other to check that the envelope detect signal from the envelope depository is a correct detect signal and then this information is supplied to the program control unit 203.

Step 12: Based on this information, the program control unit 203 reads out the next subsequent operation sequence from the read only memory for program 201*a*.

Namely, in order to close the shutter of the envelope depository 116, a shutter close signal is applied from the read only memory for program 201*a* to the output data buffer 207. In this case, since the input/output device selector 209 has already selected the envelope depository 116 in the preceding operation sequence, no selection command is sent.

Next, upon closing of the shutter, a shutter close detect signal is applied from the envelope depository 116 to the input data buffer 208 through the receive data bus. The close detect signal is then moved to the register 202*a*. At the same time, a normal close detect signal is applied to the register 202*b* from the read only memory for program 201*a* as described previously, so that the contents of the both registers 202*a* and 202*b* are compared by the arithmetic circuit 202*c* with each other to check that a correct close signal has been sent from the card reader/writer 114 and this information is applied to the program control unit 203.

Step 13: Based on this information, the program control unit 203 reads out the next subsequent operation sequence from the read only memory for program 201*a*.

Namely, the transaction data such as the identification number on the magnetic card, the envelope number, the amount of money, etc., stored in the random-access memory 205, are read out therefrom in a sequential order and once fed to the register 202*a* and then to the output data buffer 207 through the line 234. At the same time, a command of selecting the data storage 119 is applied to the input/output device selector 209 to store the above transaction data in the data storage 119.

Step 14: Then, the program control unit 203 reads out from the read only memory for program 201*a* a command of formation of the receipt and journal by the receipt and journal printer 118 as the next operation sequence.

Namely, a command of selecting the receipt and journal printer 118 is applied to the input/output device selector 209 and the aforementioned print command and the transaction data are sequentially fed from the read only memory for program 201*a* to the output data buffer 207 through the decoder 201*c*, thus actuating the receipt and journal printer 118.

The receipt and journal printer 118 prints such a receipt or journal as depicted in detail in FIG. 3 and the receipt is sent out simultaneously with returning of the magnetic card 1 to the customer (described later). Needless to say, the journal is kept as a copy of the receipt in the bank and used for checking the content of the deposited envelope later on.

Step 15: Thereafter, the program control unit 203 applies from the read only memory for program 201*a* a command of selecting the card reader/writer 114 to the input/output device selector 209 and a write data and a card return instruction to the output data buffer 207 so as to cause the card reader/writer 114 to effect writing of the data on the card and returning of the card as the next operation sequence.

Simultaneously with printing of the receipt and journal by the receipt and journal printer 118, the data storage 119 achieves recording of the transaction data which is applied to a processing unit for processing the deposit or payment.

The envelope 21 stored in the envelope storage 117 is opened, for example, after business hours of the bank to check the content. Namely, as described previously, the journal has printed thereon the envelope number, the amount of money, the customer's identification number, the transaction type, etc., so that the content of the envelope of the same envelope number as that printed on the journal is checked based on the data printed on the journal. If the amount of money printed on the journal and the content (or the transaction type and the content) of the envelope do not agree with each other, the data corresponding to the envelope number, stored in the data storage 119, is removed and notice is given to the customer for confirmation. Further, if the content of the envelope agree with the data, processing for transfer is automatically achieved by an information processing unit.

Turning now to FIGS. 5 to 8, a second example of this invention will be described.

Figure 5:
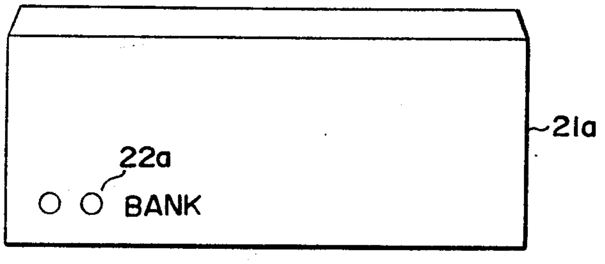
FIG. 5 is a front view showing one example of an envelope for use in the machine of this invention.

FIG. 5 is a front view illustrating one example of the envelope for use in this example.

In FIG. 5, reference numeral 21*a* indicates generally the envelope and 22*a* designates the name of a bank.

Figure 6:
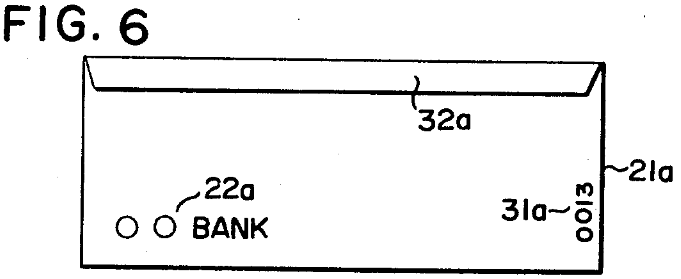
FIG. 6 is a front view of the envelope having just sealed therein an article and marked thereon an account number.

FIG. 6 is a front view showing one example of the envelope deposited in the apparatus after having sealed therein an article such as cash or the like and numbered. The parts described above in connection with FIG. 5 are identified by the same reference numerals and will not be described.

In FIG. 6, reference numeral 31*a* denotes the number marked on the envelope and 32*a* represents a sealing part of the envelope.

Figure 7:
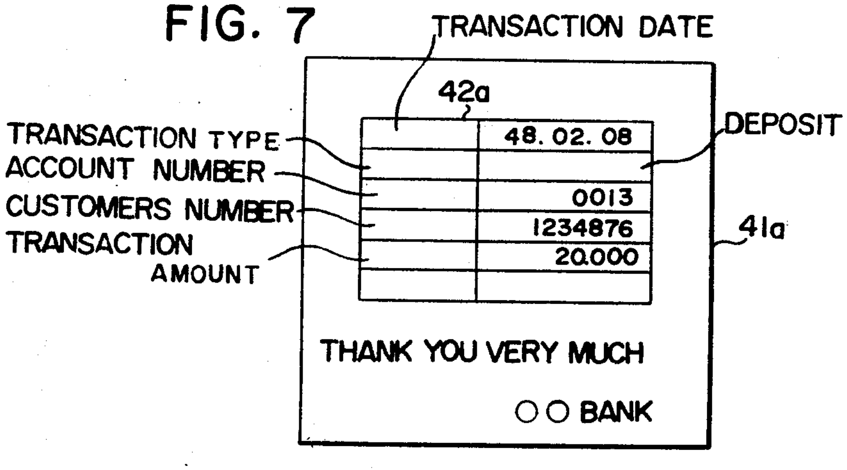
FIG. 7 is a front view showing one example of a receipt or journal issued from the machine of this invention.

FIG. 7 is a front view showing the principal part of one example of a receipt or journal which is issued from the apparatus of this example.

In FIG. 7, reference numeral 41a indicates generally the receipt or journal and 42*a* designates records such as, for example, a customer's identification number, a number indicative of serial transactions, the amount of money, the transaction type, the transaction data, etc.

Figure 8:
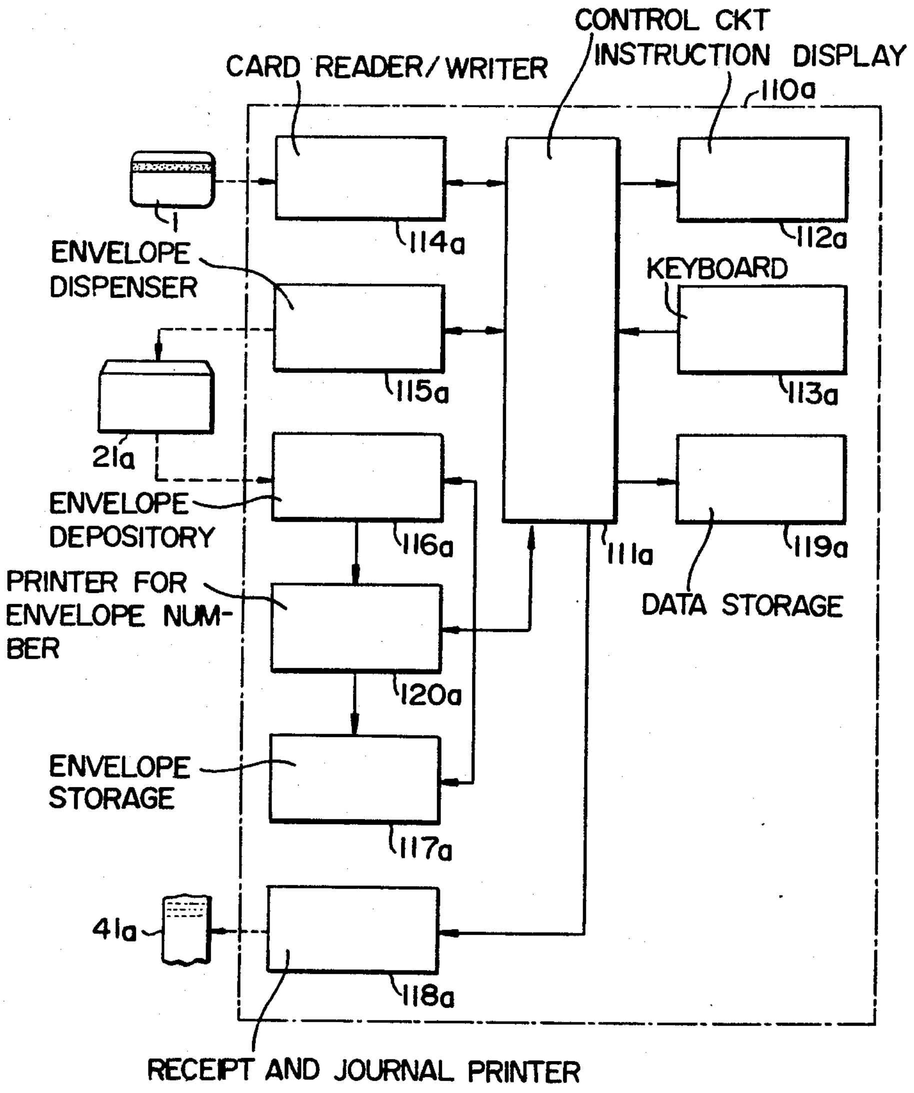
FIG. 8 is a block diagram of the principal part of another example of the machine of this invention.

FIG. 8 is a block diagram, for explaining the principal part of the apparatus of this example. As the customer's identification number entering means, a keyboard and a card reader are employed in combination and the envelope is employed as article sealing means, and a data storage and a receipt and journal printer are used in combination as storage means.

In FIG. 8, reference numeral 100*a* indicates generally the apparatus; 111a designates a control circuit; 112*a* represents an instruction display; 113*a* identifies a keyboard; 114*a* denotes a card reader/writer; 115a shows an envelope dispenser; 116*a* refers to an envelope depository; 117*a* indicates an envelope storage; 118*a* designates a receipt and journal printer; 119*a* identifies a data storage; and 120*a* denotes a numbering printer. The parts described previously in connection with FIGS. 1, 5 to 7, 18 and 19 are marked with the same reference numerals and no description will be repeated.

Figure 21:
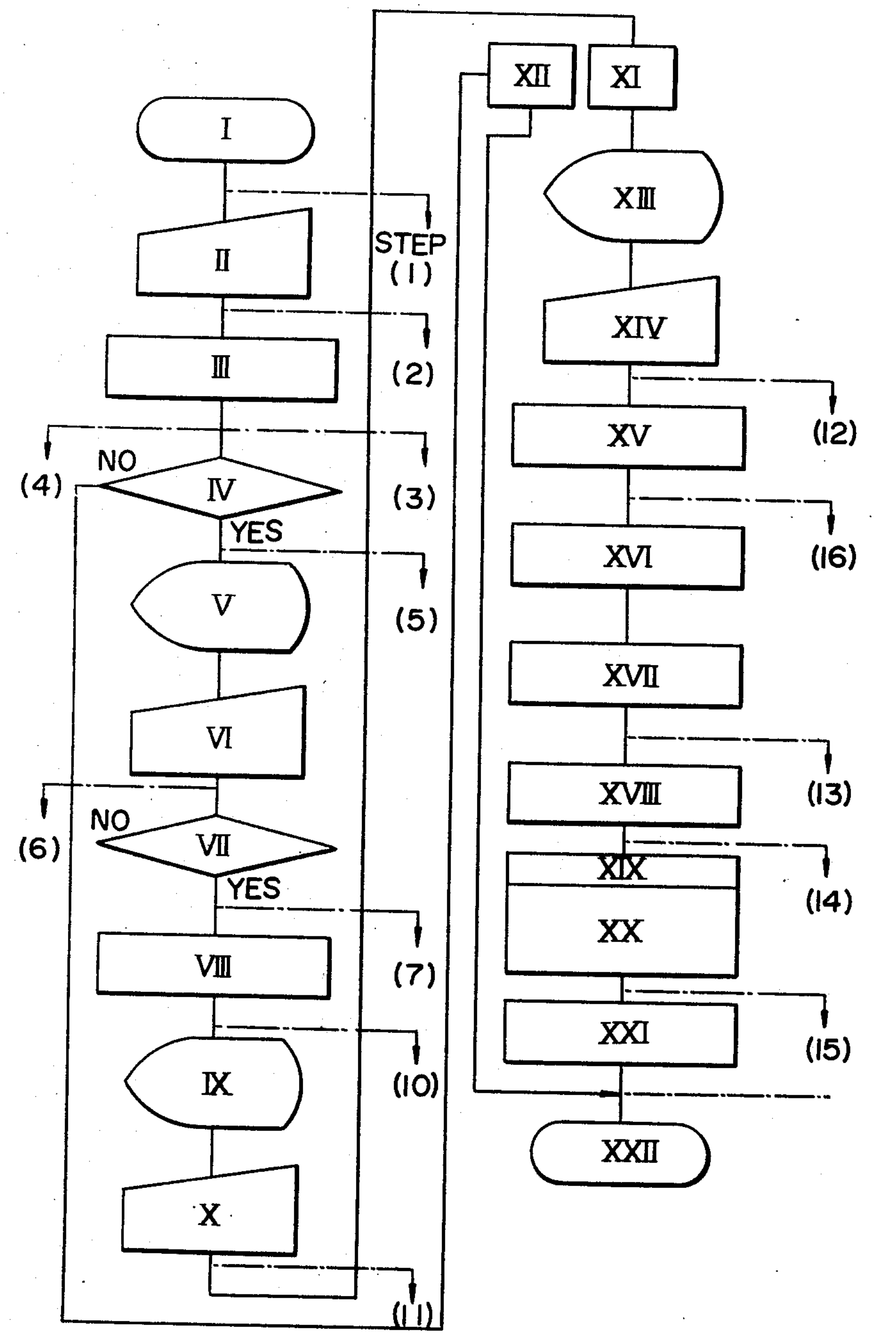

The automatic deposit or payment operation by the apparatus shown in FIG. 8 follows such steps as illustrated in the flow charts of FIGS. 21 and 21A.

At first, the magnetic card 1 shown in detail in FIG. 1 is inserted into the card reader/writer 114*a* as in the step 1 described previously and then the data on the magnetic card 1 is read out and applied to the control circuit 111a as in the step 2 described previously.

Then, the control circuit 111a checks the validity of the magnetic card 1, for example, its term of validity, kind, etc. in the same manner as in the aforementioned step 3.

If the magnetic card 1 is invalid, an invalidity signal is generated and the magnetic card 1 is returned to the customer as described previously with regard to the step 4. If the magnetic card 1 is valid, the customer is given an instruction to enter into the apparatus a secret number which only a right owner of the magnetic card 1 knows, for example, his identification number, so as to check whether the magnetic card 1 is being used by its right owner, as is the case with the step 5 previously described. This instruction is given by the instruction display 112*a*.

Having seen the above display, the customer enters his identification number by actuating the keyboard 113*a*.

In the control circuit 111a, the identification number recorded on the magnetic card 1 and the input from the keyboard 113*a* are compared with each other to check whether they bear a predetermined relation to each other. If they bear the predetermined relation, the customer is regarded as the right owner of the magnetic card 1 and the transaction is allowed to proceed further.

Where the identification number on the magnetic card and the input from the keyboard do not bear the predetermined relation to each other, the same procedure as in the case of the magnetic card 1 being invalid is followed as in the aforementioned step 6.

In the case where the transaction is allowed to proceed further, the envelope 21*a* shown in detail in FIG. 2 is dispensed from the envelope dispenser 115a as is the case with the step 7 described previously.

Further, the instruction display 112*a* gives the customer an instruction to enter the amount of money to be deposited or paid into the bank, as in the step 10 described previously.

Upon entering the amount of money in the control circuit 111*a* from the keyboard 113*a*, the instruction display 112*a* gives the customer an instruction to deposit the envelope 21*a* in the envelope depository 116*a* after sealing cash to be deposited or paid, a written request for payment, etc. in the envelope and, at the same time, the shutter of the envelope depository 116*a* is opened.

Upon depositing the envelope 21*a* in the envelope depository 116*a*, the shutter of the envelope depository 116*a* is closed as is the case with the step 13 described previously, and the transaction data is stored in the data storage 119 as in the step 14 described previously. Further, a receipt and a journal such as shown in detail in FIG. 7 are printed by the receipt and journal printer 118a and the receipt is dispensed simultaneously with returning of the magnetic card 1 to the customer in the same manner as in the aforesaid step 15. Needless to say, the journal is kept in the bank for checking the content of the envelope 21*a* later on. On the receipt and the journal, the customer's identification number, a transaction number, etc. are printed for each transaction.

Then, in the step 16 following the step 12, a number which is the same as or corresponds to a new transaction number (that 1 is added to a preceding transaction number), which is a serial number to be printed on the receipt and the journal, is printed by the numbering printer 120*a* on the deposited envelope 21*a*.

The detail of the number printed on the envelope 21*a* is depicted in FIG. 6 at 31*a*.

The envelope 21a after numbered is temporarily stored in the envelope depository 117*a*.

In the data storage 119*a*, the transaction data is recorded which is applied to a processor for processing of the deposit or payment.

The data storage 119*a* is formed with, for example, a core memory.

The envelope 21*a* deposited in the envelope depository 117*a* is opened after business hours of the bank to check its content. Namely, since the journal has printed thereon the transaction type, the transaction number, the customer's identification number, the transaction amount, etc. as described previously, the content of the envelope having printed thereon the same transaction number is checked based on the above data printed on the journal. If the printed transaction amount and the content (or the printed transaction type and the content) of the envelope do not agree with each other, the data corresponding to the aforementioned envelope number, stored in the data storage 119*a*, is removed and notice is given to the customer for confirmation. If the content agrees with the data printed on the envelope, the data stored in the data storage 119*a* is applied to automatically achieve processing for transfer.

Next, a third example of this invention will be described with reference to FIGS. 9 to 13.

Figure 9:
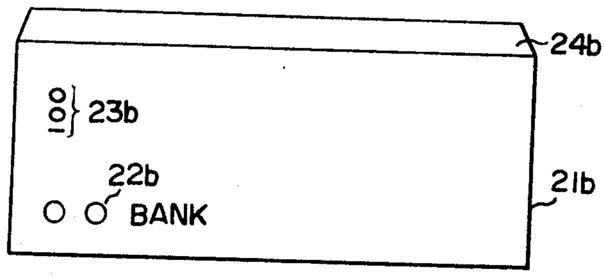
FIG. 9 is a front view illustrating one example of an envelope for use in the example of FIG. 8.

FIG. 9 is a front view showing one example of an envelope for use in this example.

In FIG. 9, reference numeral 21b indicates generally the envelope; 22*b* designates the name of a bank; 23*b* denotes a serial number printed on each envelope; and 24*b* identifies a sealing part of the envelope.

Figure 10:
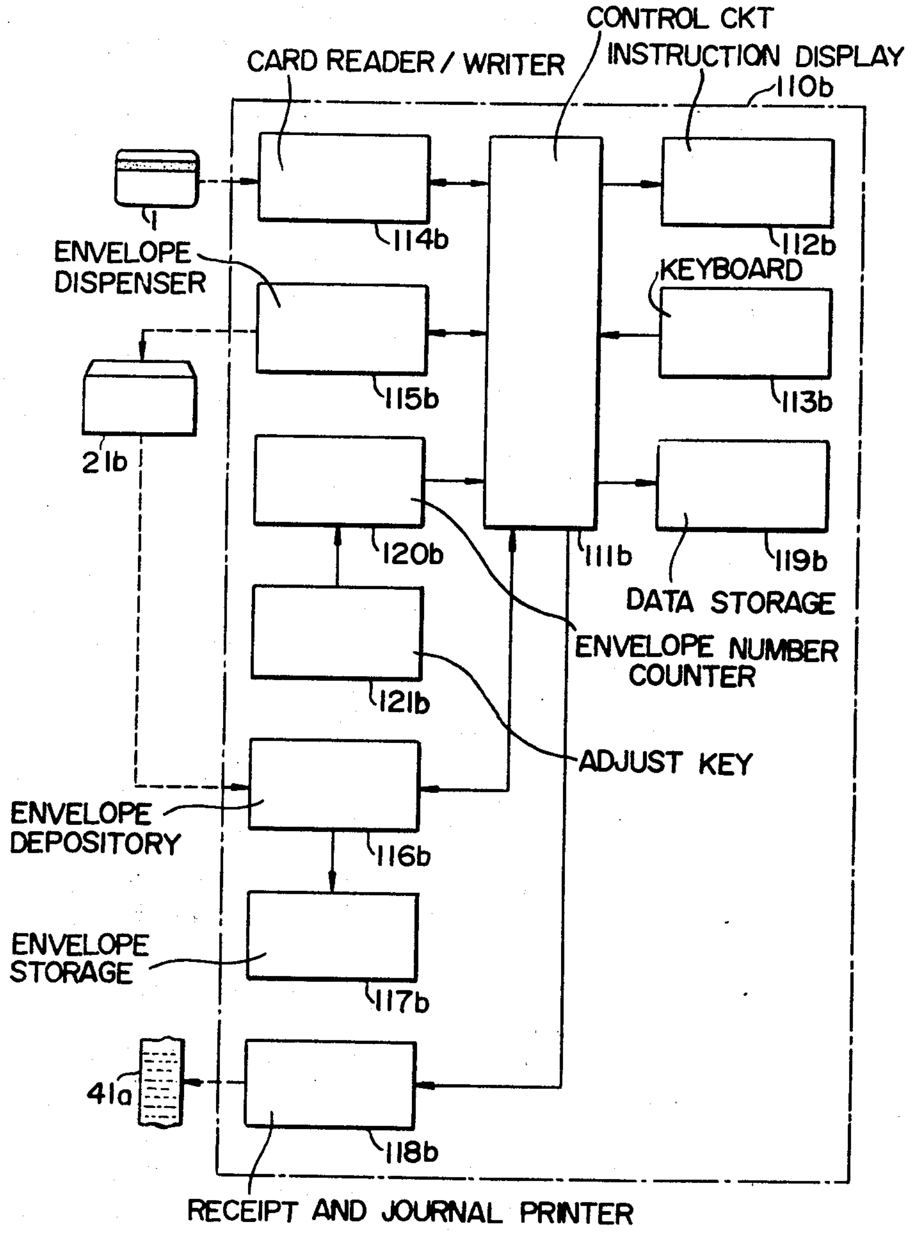
FIG. 10 is a block diagram showing the principal part of another example of the machine of this invention.

FIG. 10 is a block diagram, for explaining the principal part of the apparatus of this example, which employs a keyboard and a card reader in combination as the customer's identification number entering means, the envelope as the article container and a data storage and a receipt and journal printer in combination as the storage means.

In FIG. 10, reference numeral 110*b* indicates generally the apparatus; 111*b* designates a control circuit; 112*b* denotes an instruction display for instructing the procedure of actuation by the customer; 113*b* represents a keyboard with which the customer enters various data; 114*b* identifies a card reader/writer; 115*b* shows an envelope dispenser for dispensing an envelope for sealing therein an article to be deposited; 120*b* refers to an envelope number counter which counts up +1 (or counts down −1) in synchronism with envelope dispensing; 121*b* indicates an adjust key for bringing the envelope number into agreement with a number indicated by the envelope number counter when envelopes are newly loaded; 116*b* designates an envelope depository for receiving the envelope having sealed therein an article to be deposited; 117*b* identifies an envelope storage for storing therein the deposited envelope; 118*b* represents a receipt and journal printer; and 119*b* denotes a data storage. The parts described previously with regard to FIGS. 1, 7 to 9, 18 and 19 are marked with the same reference numerals and no description will be repeated.

Figure 22:
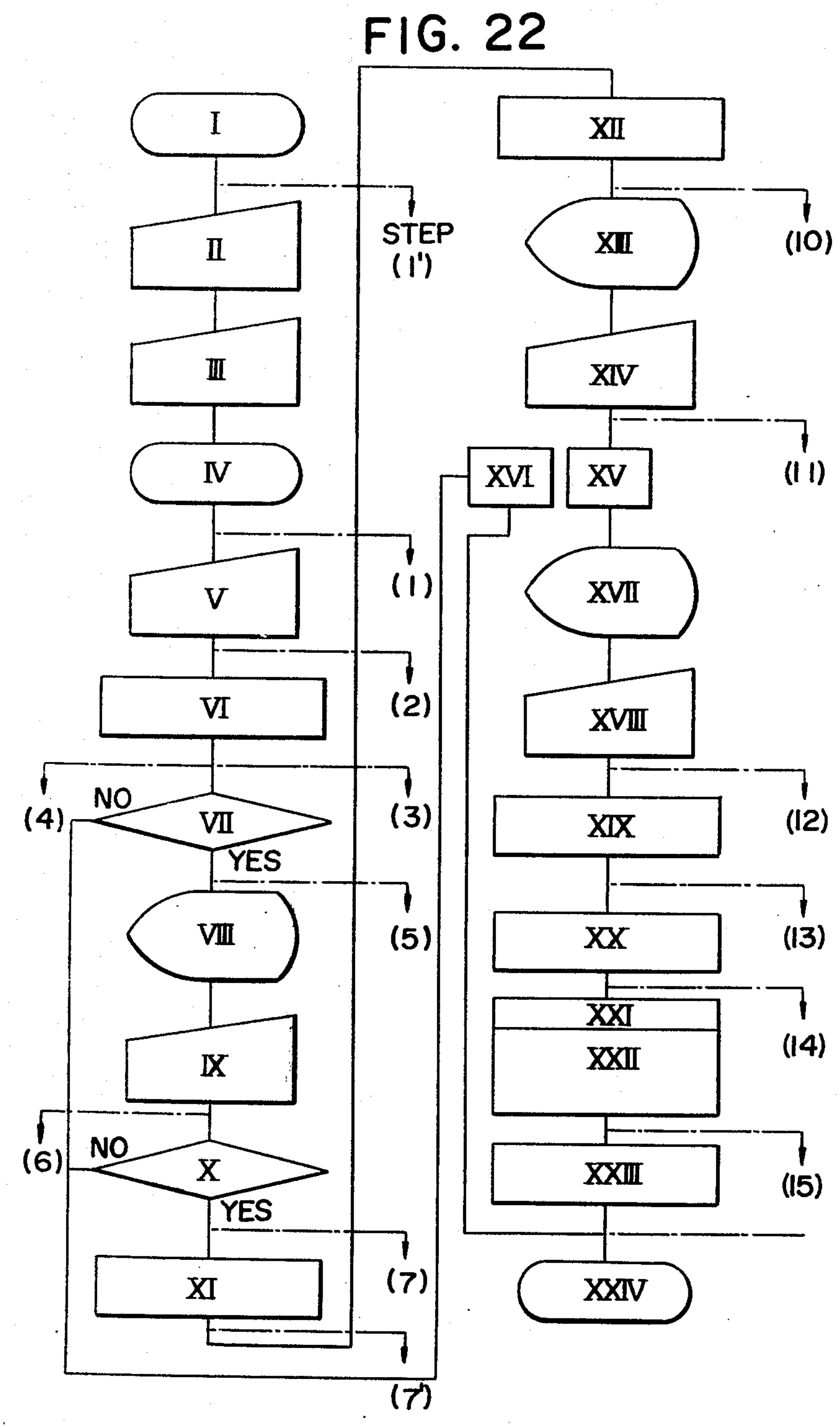

The automatic deposit or payment operation by the apparatus shown in FIG. 10 follows such steps as illustrated in FIGS. 22 and 22A.

At first, the magnetic card 1 shown in detail in FIG. 1 is inserted into the card reader/writer 114*b* as in the aforesaid step 1 and the data on the inserted magnetic card 1 is read and applied to the control circuit 111*b* as is the case with the step 2 described previously.

In the control circuit 111*b*, validity of the magnetic card 1, for example, its term of validity, kind, etc., are checked.

Where the control circuit 111*b* judges that the inserted magnetic card 1 is invalid, an invalidity signal is produced and the magnetic card 1 is returned to the customer as is the case with the step 4 described previously. If the magnetic card 1 is found to be valid, the customer is given an instruction to enter into the apparatus a secret number which only a right owner knows, that is, his identification number, so as to check whether or not the magnetic card 1 is being used by its right owner. This instruction is displayed by the instruction display 112*b*.

Given the above instruction, the customer enters his identification number by actuating the keyboard 113*b*.

In the control circuit 111*b*, the identification number recorded on the magnetic card 1 and the input from the keyboard 113 are compared with each other to be checked as to whether or not they bear a predetermined relation to each other. If they have the predetermined relation, the customer is regarded as the right owner of the magnetic card 1 and the transaction is allowed to proceed further.

If they do not bear the predetermined relation to each other, the same steps as those in the case where the magnetic card 1 is invalid are taken as in the aforesaid step 6 or the magnetic card is taken in the apparatus so as to prevent it from being used again.

When further transaction is allowed, the envelope 21*b* shown in detail in FIG. 9 is dispensed from the envelope dispenser 115*b* as in the aforesaid step 7.

The envelope 21*b* has printed thereon the serial number 23*b* as described previously and, which is in agreement with a display on the envelope number counter 120*b*.

Figure 11:
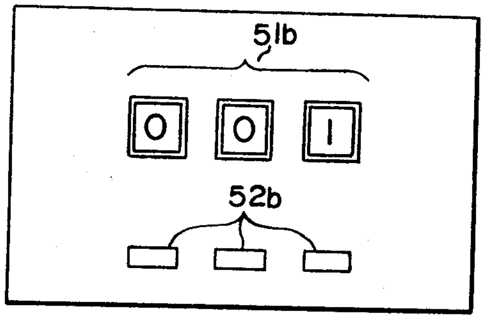
FIG. 11 is a front view illustrating the construction of an indication part of an envelope number counter.

The display part of the envelope number counter 120*b* has such a construction as depicted in FIG. 11.

In FIG. 11, reference numeral 51*b* indicates an envelope number display window and 52*b* designates manual step buttons. FIG. 11 shows the state that a first envelope has just been dispensed.

In the case of setting a new envelope 21*b* in the apparatus in a step 1′ prior to the step 1, adjustment is effected by the adjust key 121b to bring the envelope number of the envelope 21 to be dispensed and the number indicated by the envelope number counter 120*b* into agreement with each other.

Further, the number indicated by the envelope number counter 120*b* is also applied to the control circuit 111*b*.

Then, simultaneously with dispensing of the envelope 21*b*, the instruction display 112*b* gives the customer an instruction to enter the amount of money to be deposited or paid, as in the aforesaid step 10.

Upon entering the amount of money into the control circuit 111*b* from the keyboard 113*b*, the instruction display 112 gives the customer an instruction to seal cash, a written request for payment or the like in the envelope 21*b* and deposit the envelope 21*b* in the envelope depository 116*b* and, at the same time, the shutter of the envelope depository 116*b* is opened, as in the aforesaid step 11.

Upon deposition of the envelope 21*b* in the envelope depository 116*b*, the shutter of the envelope depository 116b is closed as in the aforesaid step 12 and the transaction data is stored in the data storage 119*b* as in the aforesaid step 13. Further, as in the case with the aforesaid step 14, the receipt and journal 41*a* such as depicted in FIG. 7 are printed by the receipt and journal printer 118*b* and the receipt is dispensed simultaneously with returning of the magnetic card 1 to the customer as in the aforesaid step 15. Of course, the journal is kept in the bank for checking the content of the deposited envelope 21*b* later on.

The receipt and journal 41*a* have printed thereon the envelope number indicated by the envelope number counter 120*b*. Of course, this number is the same as the envelope number printed on the deposited envelope 21*b*.

The deposited envelope 21*b* is temporarily stored in the envelope storage 117*b*.

In the data storage 119*b*, the transaction data is recorded which is to be applied to a processor for processing of the deposit or payment.

In a step 7′ subsequent to the step 7, upon completion of one transaction, the envelope number counter 120*b* counts up by +1 (or counts down by −1) to display an envelope number of an envelope which will be dispensed in the next subsequent transaction. The envelope number counter 120*b* is formed with a core memory, a mechanical counter or the like and is desired to be adapted so that even if a power source is cut off, its counted content is held as it is.

The envelope 21*b* stored in the envelope depository 117*b* is opened, for example, after business hours of the bank to check its content. Namely, since the journal has printed thereon the transaction type, the transaction number, the customer's identification number, the transaction amount, etc., the content of the envelope is checked based on the above data printed on the journal. If the amount printed on the journal and the content (or the printed transaction type and the content or the like) of the envelope does not tally with each other, the data corresponding to the envelope number, stored in the data storage 121*b*, is removed and notice is given to the customer for confirmation. If the content of the envelope tallies with the data on the envelope, the transaction data is applied to an information processor to automatically effect processing for transfer.

By the way, the foregoing examples employ the separate envelopes 21*b* but it is difficult to dispense such envelopes one by one and more than two envelopes are often dispensed at one time.

Figure 12:
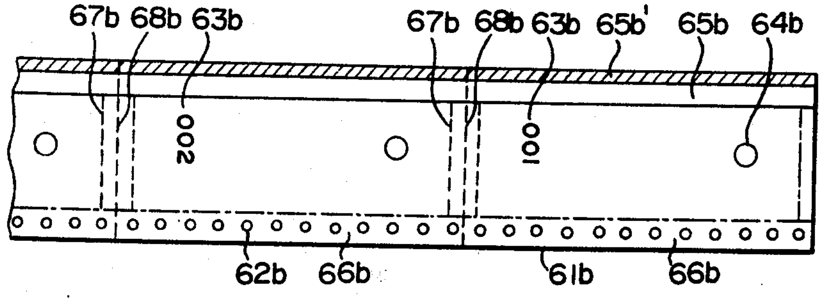
FIG. 12 is a front view showing another example of the envelope different from that depicted in FIG. 9.

Such a trouble can be avoided by the employment of such envelopes as shown in FIG. 12.

In FIG. 12, reference numeral 61*b* indicates generally continuous envelopes; 62*b* designates perforations for a sprocket; 63*b* denotes serial numbers; 64*b* represents apertures for position detecting use; 65*b* identifies a sealing part having an overlap part 65*b'*; 66*b* and 67*b* show adhesive parts; 68 refers to perforations.

The perforations 62*b* for sprocket are engaged with a sprocket and rotated thereby to transfer the envelopes 61*b*.

The envelope numbers 63*b* perform the same function as that 23*b* in the foregoing examples.

The position detecting apertures 64*b* are detected by a photoelectric conversion device, by which are produced signals on the position, dispensing and receiving of the envelope 61*b* and so on.

The overlap part 65*b'* of the sealing part 65*b* has adhered thereto a paper tape (not shown). After an article to be deposited is sealed in the envelope 61*b*, the paper tape is peeled off to expose the overlap part 65*b'* and then the sealing part 65*b* is folded on to the overlap part to seal the envelope.

The perforations 68*b* are provided to ensure cutting off of the continuous envelopes 61*b* by a cutter into individual ones. Such envelopes 61*b* are used in the manner shown in FIG. 13.

Figure 13:
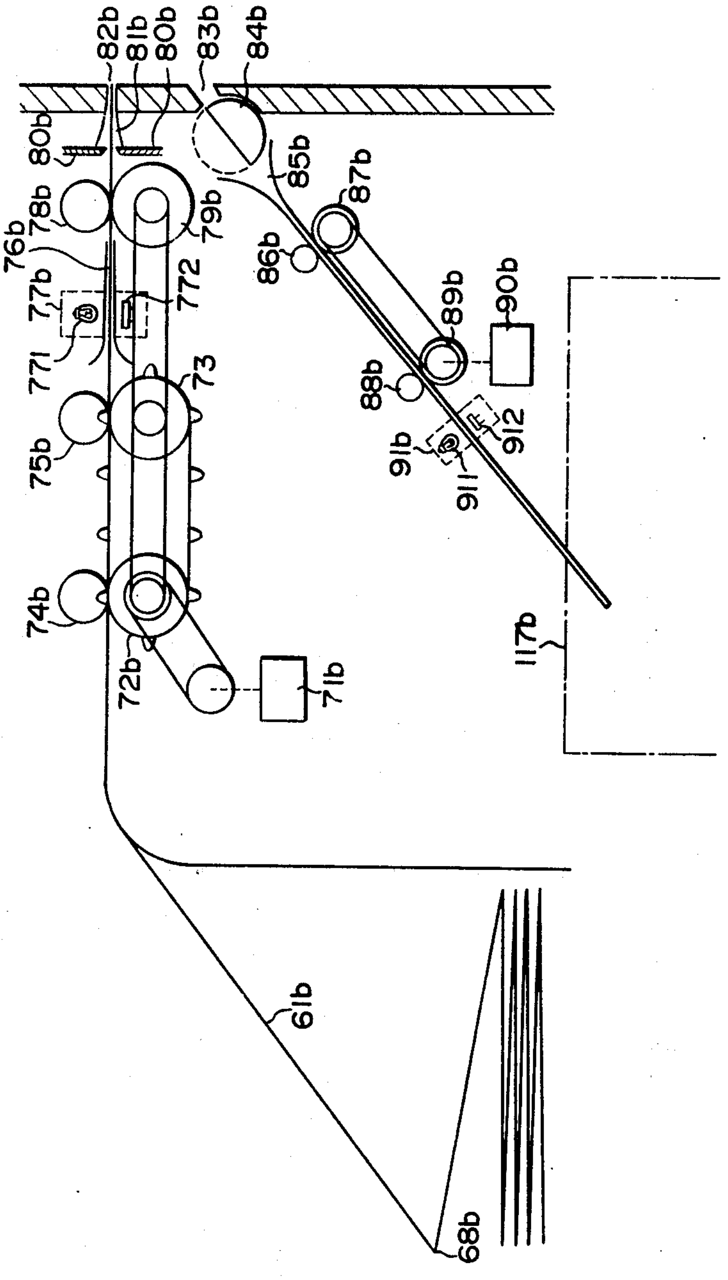
FIG. 13 is a schematic diagram, for explaining the principal part of a mechanism which is suitable for use with the envelope shown in FIG. 12.

In FIG. 13, reference numeral 61*b* indicates the envelopes folded at the perforations 68*b*; 71*b* designates a motor serving as a power source for envelope dispenser; 72*b* and 73*b* represent sprockets; 74*b* and 75*b* denote rollers; 76*b* identifies an envelope guide; 77*b* shows a position detector comprising a light source 771 and a photoconductive cell 772 or like photoelectric conversion device; 78*b* and 79*b* refer to rollers; 80*b* designates a cutter; 81*b* indicates an envelope guide; 82*b* denotes an envelope dispensing outlet; 83*b* represents an envelope depositing inlet; 84*b* identifies a rotary shutter of an envelope depository 118*b*; 85*b* shows an envelope guide; 86*b*, 87*b*, 88*b* and 89*b* designate rollers; 90*b* refers to a motor serving as a power source for envelope reception; 91*b* denotes an envelope detector comprising a light source 911 and a phtotoconductive cell 912 or like photoelectric conversion device; and 119*b* identifies an envelope storage (a safe).

With this mechanism, the envelopes 61*b* are loaded with a first one being positioned at the envelope guide 76*b* in such a manner that light from the light source 771 of the position detector may pass through the position detecting aperture 64 of the first envelope 64*b*.

At the request of the customer, the envelopes 61*b* are transferred and then stopped at the position where the position detecting aperture of a second one of the envelopes 61*b* is detected by the position detector 77*b*. The position detector 77*b* produces one pulse signal between the position detecting apertures 64*b* of the first and second envelopes 61*b* and this pulse signal is applied to the control circuit 111*b* and the envelope number counter 120*b*, as an input signal indicative of one envelope 61*b* having been dispensed.

Upon stoppage of travelling of the envelopes 61*b*, the cutter 80*b* is actuated to cut off the first envelope 61*b* from the second envelope 61*b* so that the customer may take out the first envelope 61.

Next, a description will be given of the case of depositing the envelopes 61*b* having sealed therein an article to be deposited.

The rotary shutter 84*b* of the envelope depository 116*b* is rotated open as indicated by the broken line. The envelope 61*b* put in from the envelope inlet 83*b* is guided by the envelope guide 85*b* down to the envelope depository 117*b*.

In this while, the envelope detector 91*b* detects the passage of the envelope 61*b* to close the rotary shutter 84*b*. The rotary shutter 84*b* is adapted to be automatically closed a predetermined period of time after opening if the envelope 61b is not deposited.

Turning now to FIGS. 14 to 17, a fourth example of this invention will be described.

Figure 14:
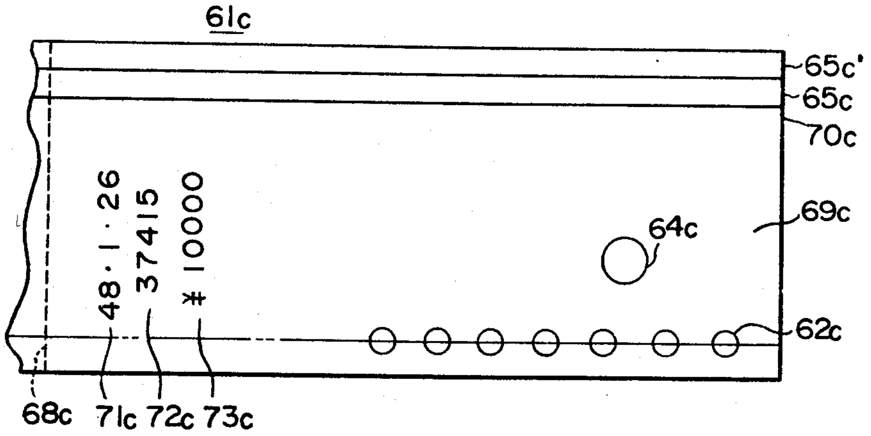
FIG. 14 is a plan view of the principal part of the deposit container.

FIG. 14 is a front view showing one example of the envelope for use in this example.

In FIG. 14, reference numeral 61*c* indicates generally the envelope; 62*c* designates perforations of the envelope 61*c*; 64*c* denotes a position detecting aperture; 65*c* identifies a flap part 65*c'* denotes an overlap part; 68*c* represents a perforation; 69*c* shows a bag portion; 70*c* refers to a fold; 71*c* indicates a date printed on the envelope; 72*c* designates an indentification number; and 73*c* the amount of money to be deposited.

Figure 15:
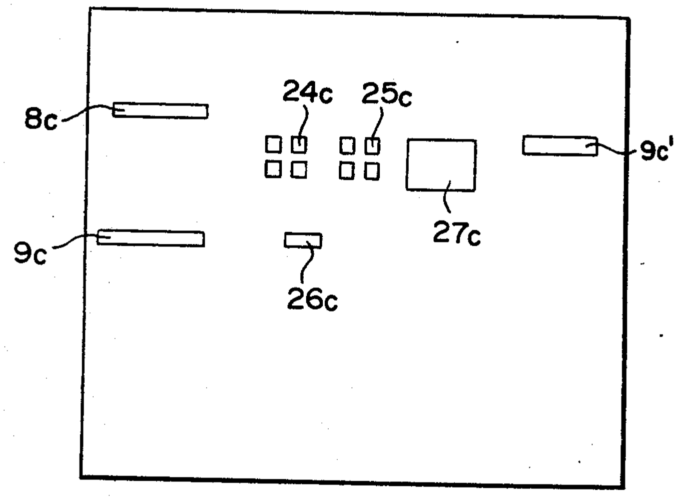
FIG. 15 is a schematic diagram, for explaining the principal part of an actuation panel.

FIG. 15 is a schematic diagram showing a keyboard panel for use in this example. Reference numeral 8*c* indicates an envelope outlet; 9*c* designates an envelope inlet; 9*c'* represents a card insertion slot; 24*c* denotes keys for entering the amount of money to be deposited or paid; 25*c* identifies keys for entering a secret number; 26*c* shows a key for entering a deposite selection signal; and 27*c* refers to a display window of an instruction display.

Figure 16:
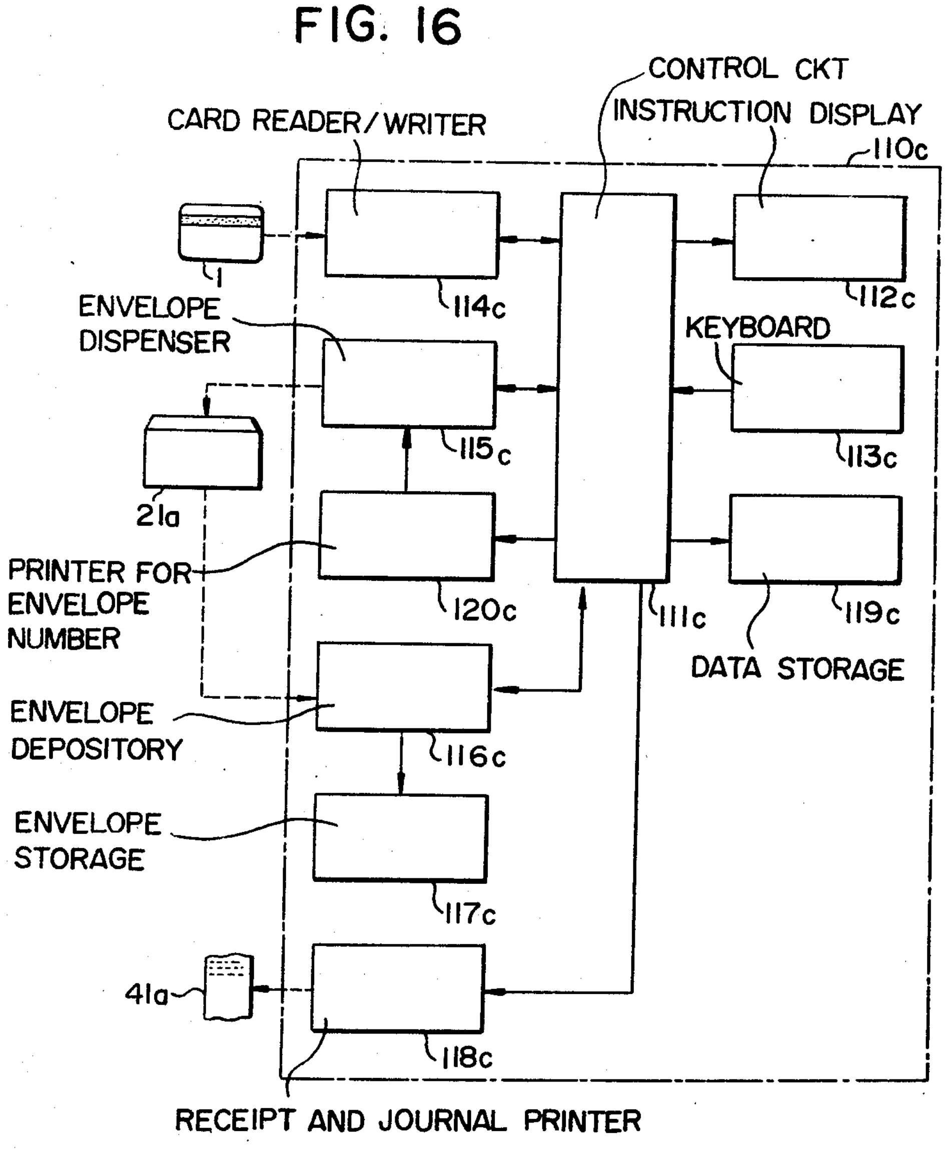
FIG. 16 is a block diagram of the principal part of another example of this invention, for explaining its operation.

FIG. 16 is a block diagram, for explaining the principal part of the apparatus of this example, which employs a keyboard and a card reader in combination as the customer's identification number entering means, an envelope as the article sealing means and a data storage and a receipt and journal printer in combination as the storage means.

In FIG. 16, reference numeral 110*c* indicates generally the apparatus; 111*c* designates a control circuit; 112*c* identifies an instruction display for displaying the procedure of actuation by the customer; 113*c* denotes a keyboard for entering various data by the customer; 114*c* represents a card reader/writer; 115*c* shows an envelope dispenser for dispensing an envelope for sealing therein an article to be deposited; 116*c* refers to an envelope depository for receiving the envelope having sealed therein the article to be deposited; 117*c* indicates an envelope storage for storing the received envelope; 118*c* designates a receipt and journal printer; 119*c* identifies a data storage; and 120*c* represents a numbering printer for printing information on the envelope. The parts described previously in connection with FIGS. 1, 7 to 9, 18 and 19 are marked with the same reference numerals and no description will be repeated.

Figure 23:
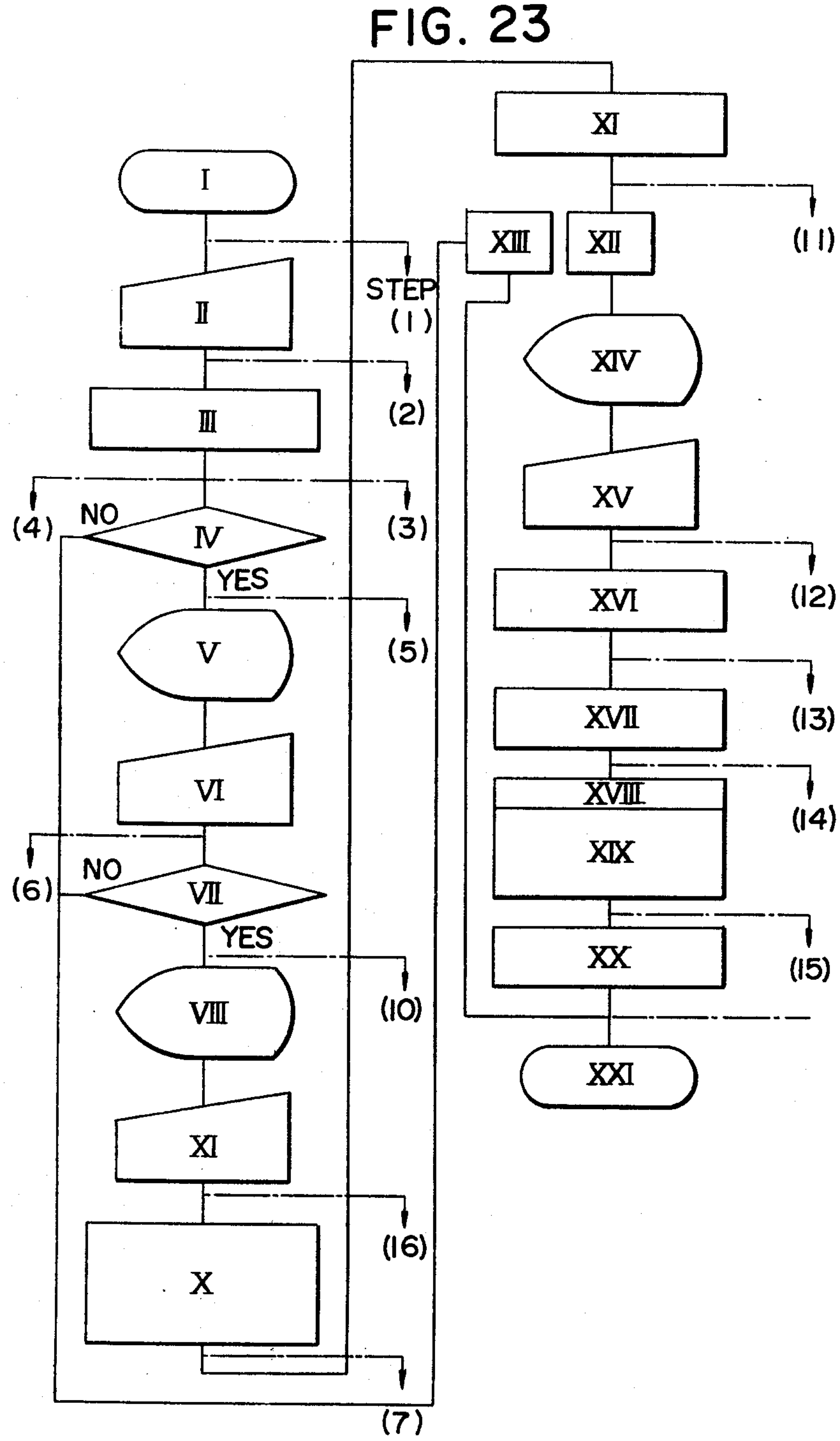

The automatic deposite or payment operation by the apparatus shown in FIG. 16 follows such steps as illustrated in flow charts of FIGS. 23 and 23*a*.

At first, the magnetic card 1 shown in detail in FIG. 1 is inserted into the card reader/writer 114*c* as in the aforesaid step 1 and the data on the inserted magnetic card 1 is read and applied to the control circuit 111*c* as in the aforesaid step 2.

In the control circuit 111*c*, validity of the magnetic card 1, for example, its term of validity, kind, etc. is checked.

Where the control circuit 111*c* judges the inserted magnetic card 1 to be invalid, an invalidation signal is produced to return the magnetic card 1 to the customer as in the aforesaid step 4. Where the magnetic card 1 is valid, the customer is given an instruction to enter into the apparatus a secret number which only a right owner knows, that is, his identification number, so as to check whether the magnetic card 1 is being used by the right owner, as in the aforesaid step 5. This instruction is given by the instruction display 112*c* on the display window 27*c* shown in FIG. 15. In compliance with the above instruction, the customer enters his identification number by actuating the secret number entering keys 25*c* of the keyboard 113c.

In the control circuit 111*c*, the identification number recorded on the magnetic card 1 and the input from the keyboard 113*c* are compared with each other to be checked as to whether or not they bear a predetermined relation to each other. If they have the predetermined relation to each other, the customer is regarded as the right owner of the magnetic card 1 and further transaction is allowed to proceed.

If they do not bear the predetermined relation, the same procedure as in the case of the magnetic card 1 being invalid is taken as in the aforesaid step 6 or the magnetic card 1 is taken in the apparatus to prevent that the magnetic card is used again.

Then, an instruction is given to the customer to enter the amount of money to be deposited and the amount of money to be deposited is entered by actuating the amount entering keys 24*c* of the keyboard 113*c* as in the aforesaid step 10.

Where the transaction has further proceeded, the envelope dispenser 115*c* dispenses the envelope 61*c* which is shown in detail in FIG. 14.

The next step 16 consists in printing of the amount of money to be deposited, the date of transaction and the customer's identification number on the envelope 61*c* by the numbering printer 120*c*. Then, an instruction is given by the instruction display 112*c* to the customer to seal cash to be deposited, a written request for payment or the like in the envelope 61*c* and deposit it in the envelope depository 116*c* and, at the same time, the shutter of the envelope depository 116*c* is opened as in the aforesaid step 11.

Upon deposition of the envelope 61*c* in the envelope depository 116*c*, the shutter of the envelope depository 116*c* is closed as in the aforesaid step 12 and the transaction data is stored in the data storage 119*c* as in the aforesaid step 13. Further, the receipt and journal 41*a* shown in detail in FIG. 7 are printed by the receipt and journal printer 118*c* as in the aforesaid step 14 and the receipt is dispensed simultaneously with returning of the magnetic card 1 to the customer as in the aforesaid step 15. Needless to say, the journal is kept as a copy for the bank for checking the content of the deposited envelope 61*c* later on.

The deposited envelope 61*c* is temporarily stored in the envelope storage 117*c*.

In the data storage 119*c*, the transaction data as recorded which will be applied to a processor for processing of the deposit or payment.

Further, the step 16 following the step 10 is replaced with a step 16'. Namely, an envelope number counter is provided and its value is printed on the envelope instead of the aforementioned identification number. Then, the envelope number counter counts up by +1 (or counts down by −1) to indicate an envelope number of an envelope which will be dispensed in the next transaction. The envelope number counter is formed with a core memory, a mechanical counter or the like and is desired to be adapted so that even if a power source is cut off, its counted content may be held as it is.

The envelope 61c stored in the envelope storage 117*c* is opened, for example, after business hours of the bank to check its content. Namely, since the journal has printed thereon the transaction type, the transaction number, the customer's identification number, the transaction amount, etc. as described previously, the content of the envelope is checked based on the above transaction data. If the above printed amount of money and the content (or the printed transaction type and the content or the like) of the envelope do not tally with each other, the data corresponding to the envelope number (stored in the data storage 119*c*) is removed and notice is given to the customer for confirmation. If the data printed on the envelope and its content tally with each other, the transaction data is applied to an information processing unit to automatically effect processing for transfer.

The information which is printed on the envelope 61*c* is selected from the numbers necessary for deposit among the numbers read out from the magnetic card, for example, the account number, the bank number, the type of deposit, etc.

Figure 17:
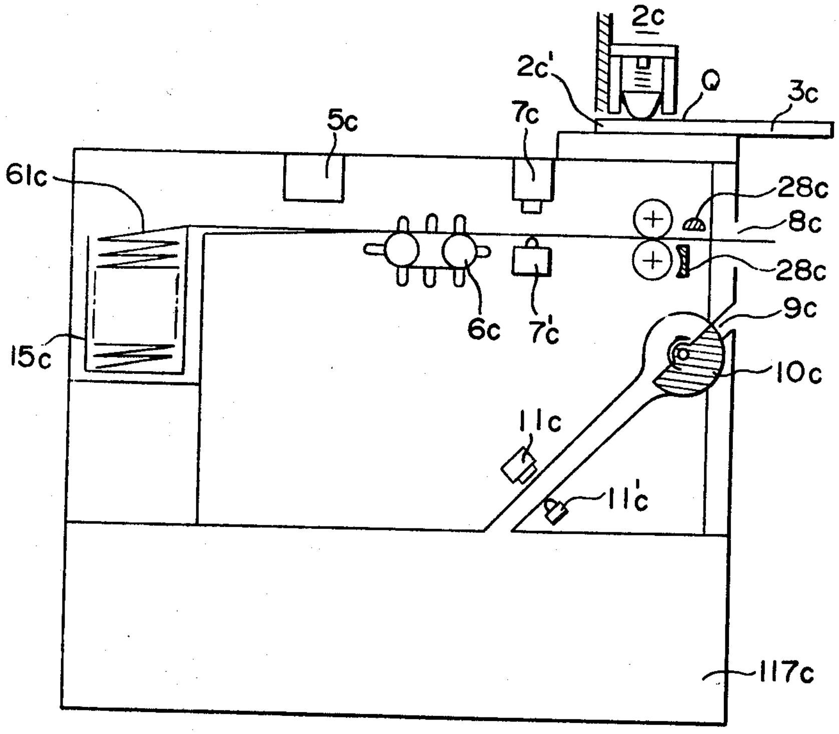
FIG. 17 is a schematic diagram of the principal part of another example of the machine of this invention.

Referring now to FIG. 17, a description will be made with regard to the envelope dispenser and envelope depository employed in this example. In FIG. 17, reference numeral 2*c* indicates a card read-out section; 2*c'* designates a magnetic head; 3*c* identifies a card; 61*c* represents an envelope; 5*c* denotes a printer; 6*c* shows a paper feeder; 7*c* refers to a light source; 7*c'* indicates a photoelectric conversion cell; 8*c* represents an envelope outlet; 9*c* identifies an envelope inlet; 10*c* denotes a shutter; 11*c* shows a light source; 11*c'* represents a photoelectric conversion cell; 15*c* refers to an envelope container; 28*c* designates a cutter; and 117*c* indicates an envelope storage.

At first, a print command is fed to the printing mechanism 5*c* of the numbering printer 120*c* from the control circuit 111*c* shown in FIG. 16. Supplied with the print command, the printing mechanism 5*c* prints on the envelope 61*c* the aforesaid numbers necessary for deposit, as indicated by 71*c*, 72*c* and 73*c* in FIG. 14. It is also possible to print a serial number on the envelope beforehand or simultaneously with printing the aforesaid deposit information.

Upon completion of printing the predetermined matters on the envelope 61*c*, a paper feed signal is applied to the paper feeder 6*c* from the control circuit 111c to start feeding of the envelope 61*c*. The paper feeder 6*c* feeds the envelope 61*c* to the envelope outlet 8*c* until the position detecting aperture 64*c* of the subsequent envelope 61*c* which has not printed thereon the aforementioned predetermined matters is detected by the light source 7*c* and the photoelectric conversion cell 7*c'* and the envelope is cut off by the cutter 28*c* along the perforation 68*c*.

When the predetermined period of time has passed after dispensing of the envelope 61*c*, a shutter open signal is applied to the shutter 10*c* from the control circuit 111*c*, by which the shutter 10*c* is rotated through 180° in a direction of the arrow to open the envelope inlet 9*c*.

Then, the envelope having sealed therein cash by the depositor and deposited from the envelope inlet 9*c* is detected by the light source 11*c* and the photoelectric conversion cell 11*c*', by which the shutter 10*c* is turned through 180° in the direction of arrow to close the envelope inlet 9*c* or by the actuation of a timer, the shutter 10*c* is closed. The shutter 10*c* may also be rotated through 180° in a direction opposite from that of the arrow. The deposited envelope 61*c* is stored in the envelope storage 111*c*. Upon closing the shutter 10*c*, a receipt, on which the date of transaction, the amount of deposit, the account number a printed by the receipt and journal printer 118*c* (not shown), is returned together with the card 3*c*.

Next, an envelope setting method will be described.

At first, the envelopes 61*c* are stored in the envelope container 15*c*. Of course, the envelope container 15*c* may also be dispensed with. The envelope feeding perforations 62*c* of the first one of the envelopes 61*c* are engaged with projections of the paper feeder 6*c*, an automatic setting key (not shown) is pressed and the envelope 61*c* is fed by the paper feeder 6c until the position detecting aperture 64*c* is detected by the light source 7*c* and the photoelectric conversion cell 7*c*'. Upon detection of the position detecting aperture 64*c*, the paper feeder is stopped, thus completing setting of the envelopes 61*c*.

The operations which the customer is required by the above example of the apparatus of this invention to perform are as follows:

At first, the customer inserts the magnetic card 3*c* into the card insertion slot Q of the card read-out section 2*c*. Then, he pushes the secret number input keys 25*c* to enter a number which is identical with or corresponds to that recorded on the magnetic card 3*c*.

Next, he pushes the deposit selection signal input key 26*c* to enter a deposit selection signal and also pushes the amount input keys 24 to enter the amount of money to be deposited, after which he receives the envelope 61 having printed thereon the predetermined matters (the account number, the amount of money to be deposited, the date of transaction, etc.) as depicted in FIG. 14.

The depositor puts cash in the bag portion 69*c* of the envelope 61*c* cut off along the perforation 68*c*.

Then, he peels off the tape put on the overlap width 65*c*, folds up the overlap width along the fold 70*c* and put it on the bag portion 69*c*.

Next, he puts in the envelope 61*c* from the envelope inlet 9*c*.

It will be apparent that many modifications and variations may be effected without departing from the scope of the novel concepts of this invention.

What is claimed is:

1. An article depositing machine for performing automatic deposit transaction operations in conjunction with verification of customer identification, comprising:

means for entering customer identification information, means responsive to said customer identification information entered by said entering means, for checking the validity of said information and producing an authorization output for enabling a deposit transaction in response to such entered customer identification information being valid, means responsive to said authorization output of said checking means for issuing an article container to the customer, said article container including means for receiving and sealing therein a desired article to be deposited, and receiving and storing means operable in response to said authorization output of said enabling means for receiving said article container by deposit therein, and storing said deposited article container.

2. A machine as recited in claim 1 wherein each said article container has container identification information associated therewith, and there is further provided means responsive to an authorization output of said checking means for storing the container identification information in association with said customer identification information for each said authorized deposit transaction.

3. A machine as recited in claim 1 wherein there is further provided means responsive to an authorization output of said checking means for printing a valid customer identification information on said article container dispensed for the authorized transaction.

4. A machine as recited in claim 3 wherein said printing means prints said customer identification information on said article container in advance of said dispensing means dispensing said article container for an authorized deposit transaction.

5. A machine as recited in claim 3 wherein said printing means prints said customer identification on said article container subsequently to receipt of deposit thereof by said receiving means for an authorized deposit transaction and prior to storing of said article container by said storing means.

6. An article depositing machine as recited in claim 1 wherein:

said entering means further includes means for entering transaction information in response to said checking means verifying the customer identification, and there is further provided storing means for storing the customer identification information and the entered transaction information for the authorized deposit transaction.

7. A machine as recited in claim 6 wherein each said article container has associated therewith container identification information uniquely identifying each such container, and said storing means is responsive to said checking means for storing the container identification information in association with the customer identification and deposit transaction information entered by said entering means.

8. A machine as recited in claim 7 wherein there is further provided printing means responsive to an authorized deposit transaction for printing the customer identification and transaction information on said article container.

9. A machine as recited in claim 9 wherein there is further provided means for receiving said customer identification information, said transaction information, and said container identification information from said information storing means for producing a journal record of the deposit transaction.

10. An article depositing machine as recited in claim 1 wherein said receiving and storing means includes:

a deposit inlet, a shutter normally positioned to close the said inlet, means responsive to said checking means and to said automatic article container dispensing means for moving said shutter to open said inlet a predetermined period of time after dispensing of said article container so as to permit deposit of said article container through said deposit inlet, means for detecting an article container, deposited through said deposit inlet, and said shutter control means being responsive to detection of a deposited article container by said detecting means for moving said shutter to close said deposit inlet.

11. A machine as recited in claim 10 wherein said control means for said shutter includes timing means for automatically moving said shutter to close said deposit inlet a further predetermined period of time following movement of said shutter for opening said deposit inlet.

12. A machine as recited in claim 10 wherein there is further provided means for detecting movement of said shutter for closing said deposit inlet, and means responsive to the shutter closure detecting output of said detection means for issuing a receipt for the transaction.

13. A machine as recited in claim 1 wherein each said article container has a predetermined serial number stored thereon and there is further provided means for storing the serial number of each article container as automatically dispensed in response to an authorized deposit transaction, said entering means including means for entering the serial number of the dispensed article container, and means for comparing the stored article container serial number with the entered number for the dispensed article container to verify the accuracy thereof.

14. An article depositing machine as recited in claim 1 wherein said article containers are provided as a continuous elongated strip of a plurality of containers, and said dispensing means includes means responsive to said authorization output of said checking means for dispensing a single one of said article containing means and severing same from said continuous strip thereof, thereby to dispense individual said article containers, in succession, for successive said authorization outputs of said checking means for successive deposit transactions.

15. A machine as recited in claim 14 wherein there is further provided counter means for counting each successive authorization output of said checking means, and printer means for printing the transaction number of an authorized transaction on said article container means, said dispensing means receiving said article container with said transaction number printed thereon for identification of said article container prior to dispensing thereof.

16. A machine as recited in claim 1 wherein each customer authorized to perform deposit transactions is issued a card having magnetically encoded thereon a unique number for identifying the customer and is provided a second unique number bearing a predetermined relationship to said first unique number also for identifying said given customer, wherein said entering means comprises:

means providing for insertion of a customer card into said machine, means for reading at least said first unique number encoded on an inserted card, manually operated data entry means for entering the second unique number, and said checking means is responsive to said first and second unique numbers as read by said card reader and entered by said manually-operated data entry device, respectively, for determining the existence of a predetermined relationship therebetween, thereby to verify the customer identification and to authorize a deposit transaction.

17. An article depositing machine for performing automatic deposit transaction operation in conjunction with verification of customer identification, comprising:

control means for establishing a prescribed sequence of operations attendant a requested deposit transaction, and for processing information related to the deposit transaction, means for entering customer identification information, verification means, said control means responding to entered customer identification information to enable said verification means to verify the customer identification entered by said entering means and to produce an authorization output for enabling a deposit transaction in response to such entered customer identification being verified as valid, means responsive to said authorization output of said verification means for dispensing an article container to a customer, means for receiving and storing an article container deposited therein, said receiving means normally being disposed to a closed position to prevent deposit therein, and said control means opening said receiving means a predetermined time following dispensing of said article container by said dispensing means and maintaining said receiving means in said opened condition for a second predetermined period of time and thereafter closing said receiving means, said storing means thereupon storing any article container deposited in said receiving means.

18. A machine as recited in claim 17 wherein said receiving means includes detecting means for detecting an article container deposited therein, and said controlling means is responsive to an article detection output of said detection means for closing said receiving means upon detection of a deposited article container in said receiving means.

19. An article depositing machine as recited in claim 17 wherein each said article container has an article container identification associated therewith, and there is further provided means for storing the article container identification in response to dispensing of each said article container in association with the customer identification information, and there is further provided means for entering information regarding the deposit transaction, said control means enabling said transaction information entering means and supplying the entered transaction information to said storing means in association with said container and customer identification, and means for providing a record of each deposit transaction, said control means transferring said information from said storing means to said recording means upon conclusion of a transaction.

* * * * *

UNITED STATES PATENT AND TRADEMARK OFFICE

CERTIFICATE OF CORRECTION

PATENT NO. : 3,973,237

DATED : August 3, 1976

INVENTOR(S) : Yoji Sawaguchi, Koichi Suzuki, Katsumasa Ogawa

It is certified that error appears in the above-identified patent and that said Letters Patent are hereby corrected as shown below:

Column 7, line 22, after "arithmetic" insert parenthesis --)--.

Column 22, line 59, change "claim 9" to read -- claim 7 --.

Signed and Sealed this

Nineteenth Day of October 1976

[SEAL]

Attest:

RUTH C. MASON
*Attesting Officer*

C. MARSHALL DANN
*Commissioner of Patents and Trademarks*